United States Patent
Toda

(10) Patent No.: US 9,430,446 B2
(45) Date of Patent: Aug. 30, 2016

(54) INFORMATION PROCESSING APPARATUS, METHOD AND STORAGE MEDIUM INCLUDING A FUNCTION FOR ESTABLISHING EXCEPTIONS APPLIED TO PRINT SETTINGS WHEN SPECIFIED CONDITIONS ARE MET

(75) Inventor: Masanari Toda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1257 days.

(21) Appl. No.: 12/634,428

(22) Filed: Dec. 9, 2009

(65) Prior Publication Data

US 2010/0142001 A1    Jun. 10, 2010

(30) Foreign Application Priority Data

Dec. 10, 2008 (JP) .................. 2008-314615

(51) Int. Cl.
*G06F 17/00* (2006.01)
*G06F 17/21* (2006.01)

(52) U.S. Cl.
CPC ..................... *G06F 17/21* (2013.01)

(58) Field of Classification Search
CPC ....................................... G06F 17/21
See application file for complete search history.

(56) References Cited

U.S. PATENT DOCUMENTS

| | | | |
|---|---|---|---|
| 7,426,057 B2 * | 9/2008 | Mori et al. .................. | 358/1.18 |
| 7,826,074 B1 * | 11/2010 | Wang ..................... | G06F 3/0317 358/1.13 |
| 2004/0163049 A1 | 8/2004 | Mori | |
| 2005/0162677 A1 * | 7/2005 | Toumanova .......... | G06F 3/1204 358/1.13 |
| 2005/0190405 A1 * | 9/2005 | Tomita ................. | G06F 3/1206 358/1.18 |
| 2005/0213148 A1 * | 9/2005 | Gong ........................... | 358/1.15 |
| 2006/0206866 A1 * | 9/2006 | Eldrige .................. | G05B 15/02 717/122 |
| 2007/0268519 A1 * | 11/2007 | Appercel .............. | G06F 3/1205 358/1.15 |
| 2007/0273895 A1 * | 11/2007 | Cudd .................... | G06F 3/1208 358/1.1 |
| 2008/0144088 A1 * | 6/2008 | Furuya ........................ | 358/1.15 |
| 2008/0232885 A1 * | 9/2008 | Mock ..................... | G06Q 90/00 400/76 |
| 2010/0027052 A1 * | 2/2010 | Ferlitsch ............... | G06F 3/1204 358/1.15 |

FOREIGN PATENT DOCUMENTS

JP      2004-252665      9/2004

* cited by examiner

*Primary Examiner* — Laurie Ries

(74) *Attorney, Agent, or Firm* — Canon U.S.A., Inc. IP Division

(57) ABSTRACT

An information processing apparatus, method and storage medium having a feature for establishing exceptions applied to print settings when specified conditions are met. A user is permitted to enter exceptions to the general print settings for a document. The exceptions apply only to specified objects in the document and only under certain conditions specified by the user. The exceptions and the general print settings are saved into a template.

9 Claims, 24 Drawing Sheets

FIG.4

| NO | ATTRIBUTE INFORMATION | | APPLICATION |
|----|----|----|----|
| 1 | PRINT METHOD | ONE-SIDED/TWO-SIDED/ BOOKBINDING PRINTING | |
| 2 | PAPER SIZE | ORIGINAL SIZE/ FIXED SIZE | · AUTOMATICALLY DESIGNATE "PAPER BREAK" WHEN FIXED SIZE IS SELECTED<br>· CHANGEABLE FOR ONLY DESIGNATED PAPER WHEN PLURAL TYPES OF PAPERS ARE SELECTED IN BOOK, AND CHANGE OF PAPER SIZE IS FEASIBLE FOR DESIGNATION OF BOOK ADJUSTMENT |
| 3 | PAPER ORIENTATION | PORTRAIT/ LANDSCAPE | · SELECTABLE ONLY FOR FIXED SIZE |
| 4 | BINDING MARGIN/ BINDING DIRECTION | | · SHIFT/ENLARGE-REDUCE DESIGNATION IS FEASIBLE |
| 5 | N-UP PRINT DESIGNATION | PAGE NUMBER/ PLACEMENT ORDER/ BORDER LINE/ PLACEMENT POSITION | · NINE PATTERNS ARE AVAILABLE IN DISCHARGE POSITION<br>· DIRECT PRINT DESIGNATION IS FEASIBLE |
| 6 | ENLARGE/REDUCE | ON/OFF | · AUTOMATICALLY DESIGNATE ON OR OFF WHEN FIXED PAPER SIZE OR N-UP PRINT IS SELECTED FOR PAPER SIZE |
| 7 | WATERMARK | DISPLAY/NON-DISPLAY | · DETERMINE WHETHER TO DISPLAY ALL WATERMARKS DESIGNATED BY BOOK |
| 8 | HEADER/FOOTER | DISPLAY/NON-DISPLAY | · DETERMINE WHETHER TO DISPLAY ALL HEADERS AND FOOTERS DESIGNATED BY BOOK |
| 9 | PAPER DISCHARGE METHOD | STAPLE | · "OFF" IS SELECTABLE WHEN STAPLE IS DESIGNATED BY BOOK. DEFAULT SETTING IS "ON" |
| 10 | BOOKBINDING DETAILS | OPENING DIRECTION/ SADDLE STITCH/ ENLARGE-REDUCE DESIGNATION/ BINDING MARGIN/ SEPARATE VOLUME | |
| 11 | FRONT COVER/ BACK COVER | | · PRINTING SETTING FOR FRONT COVER AND BACK COVER<br>· DESIGNATE PAPER FEED PORT |
| 12 | INDEX SHEET | | · CHARACTER STRING PRINTING TO INDEX PORTION AND ANNOTATION ON INDEX SHEET ARE SETTABLE |
| 13 | INTERLEAF | | · DESIGNATE PAPER FEED PORT<br>· PRINTING OF ORIGINAL DATA ON INSERTED SHEET IS FEASIBLE |
| 14 | CHAPTER BREAK | "NO BREAK"/ "PAGE BREAK"/ "PAPER BREAK" | · FIXED TO "PAPER BREAK" WHEN INDEX SHEET OR INTERLEAF IS DESIGNATED |

FIG.13

| EDITING OF TEMPLATE | ☒ |

| SHEET SETTINGS | PAGE SETTINGS | FINISHING | PAPER FEED | SHEET INSERTION SETTINGS | SHEET HEAD/TAIL |

PRINT METHOD(Y):  ⊙ ONE-SIDED PRINTING
　　　　　　　　　　 ○ TWO-SIDED PRINTING
　　　　　　　　　　 ○ BOOKBINDING PRINTING

BINDING DIRECTION(B): [ LONG-SIDE BINDING (LEFT) ▼]

BINDING WIDTH(G): [ 0 ⇅ ] mm (0~30)

ADJUSTMENT OF ORIGINAL(J):
⊙ REDUCE ACCORDING TO PRINT AREA SET IN MARGINS
○ MOVE ACCORDING TO BINDING WIDTH

DESIGNATION OF STAPLE(S): [ NO ▼]

POSITION OF STAPLE(L): [ UPPER LEFT (ONE PORTION) ▼]

☐ PUNCH HOLE(N)
☐ Z-FOLDING(Z)

CHAPTER BREAK(X): [ NOT DESIGNATED ▼]

[ OK ] [ CANCEL ] [ HELP(H): ]

INFORMATION PROCESSING APPARATUS, METHOD AND STORAGE MEDIUM INCLUDING A FUNCTION FOR ESTABLISHING EXCEPTIONS APPLIED TO PRINT SETTINGS WHEN SPECIFIED CONDITIONS ARE MET

BACKGROUND OF THE INVENTION

1. Field of the Invention

The present invention relates to an information processing apparatus that can provide a function for enabling users to perform print settings for a document file, for example, generated by a general application. The present invention also relates to a method for controlling the information processing apparatus and to a storage medium.

2. Description of the Related Art

In a print service workflow system, an application is conventionally available for a printer user to import an original generated by an uploading user who uses a general document generation application (i.e., a general application) and to perform print settings. This kind of application can be provided by a software program that can form a single integrated application from various applications, which is, for example, referred to as "Office suite."

The integrated application enables users to put together data generated by respective applications as a single document file using a specific application contained in the integrated application.

Conventionally, the above-described integrated application can provide a registration function for registering in advance, as a template, various information (e.g., page layout, output sheet, and one-sided printing/two-sided printing/bookbinding) having been set for an edited document. For example, when a user generates a new document, the user can select a desired template from a plurality patterns of templates registered beforehand. Therefore, the user can easily edit the document file.

The template can be converted into a file and can be stored as a template file. Therefore, users can newly generate template files and can change existing template data. Further, the above-described integrated application provides a template file import/export function for transmitting template files to other personal computers (PCs) and receiving template data from other PCs.

Further, a conventional technique discussed in Japanese Patent Application Laid-Open No. 2004-252665 can register, as template information, print settings of a document edited by the integrated application. The technique discussed in this prior art enables users to easily set complicated print settings by directly applying the registered print settings to a new document.

In the print service workflow, each original generated by the uploading user can be integrated into a document file by the printer user before the original is printed. However, the uploading user may confirm and check a print sample (i.e., an integrated result) and may correct the document file, before the uploading user requests the printer user to perform a finalized printing.

While the performances of recent printers are highly advanced, the integrated application enables users to perform complicated print settings (including exception settings) for each setting object, such as a page or a chapter, which constitutes an element of a document file. The print settings applicable to each setting object include, for example, insertion of a tab sheet, insertion of an interleaf, insertion of a white sheet, designation of forced monochrome printing, and switching of paper types.

However, compared to the general print settings applied to the entire document file, the exception settings applied to each setting object are dependent on each setting object (e.g., each chapter of the original or each page of the original). Therefore, the exception settings applied to each setting object cannot be registered as a template. Therefore, the uploading user is required to perform the settings again by applying, to the corrected document file, the exception settings having been set for each setting object that constitutes the document file. In other words, the uploading user is frequently required to perform a very complicated work.

SUMMARY OF THE INVENTION

The present invention is directed to an information processing apparatus, a method for controlling the information processing apparatus, and a storage medium storing a software program for controlling the information processing apparatus.

According to an aspect of the present invention, an information processing apparatus includes a setting unit configured to set application conditions relating to exception setting contents for a document file according to a user's instruction if at least one exception setting is set for a plurality of setting objects included in the document file, a registration unit configured to register the exception setting contents and the application conditions set by the setting unit as a template, a selection unit configured to enable a user to select a template to be applied to a document file, which serves as an editing object, from templates registered in the registration unit, and an application unit configured to apply the exception setting contents contained in the template selected by the selection unit to a setting object satisfying the application conditions included in the template selected by the selection unit.

According to an exemplary embodiment of the present invention, exception setting contents having been set for a setting object contained in a document file can be registered as a template. Therefore, the exemplary embodiment of the present invention can reduce the burden of a user in a work.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B illustrate an example of a book file structure according to an exemplary embodiment of the present invention, in which FIG. 3A is a schematic example of a book file format and FIG. 3B is a configuration of original data.

FIG. 4 illustrates an example of book attributes according to an exemplary embodiment of the present invention.

FIG. 13 illustrates an example of a UI screen that can be selected for a conventional template editing in the document processing system according to an exemplary embodiment of the present invention.

DESCRIPTION OF THE EMBODIMENTS

Various exemplary embodiments, features, and aspects of the invention will be described in detail below with reference to the drawings.

A document processing system according to an exemplary embodiment of the present invention includes an electronic original writer that can convert a data file generated by a general application into an electronic original file. A bookbinding application according to an exemplary embodiment of the present invention has a function for editing the electronic original file.

Figure 1:
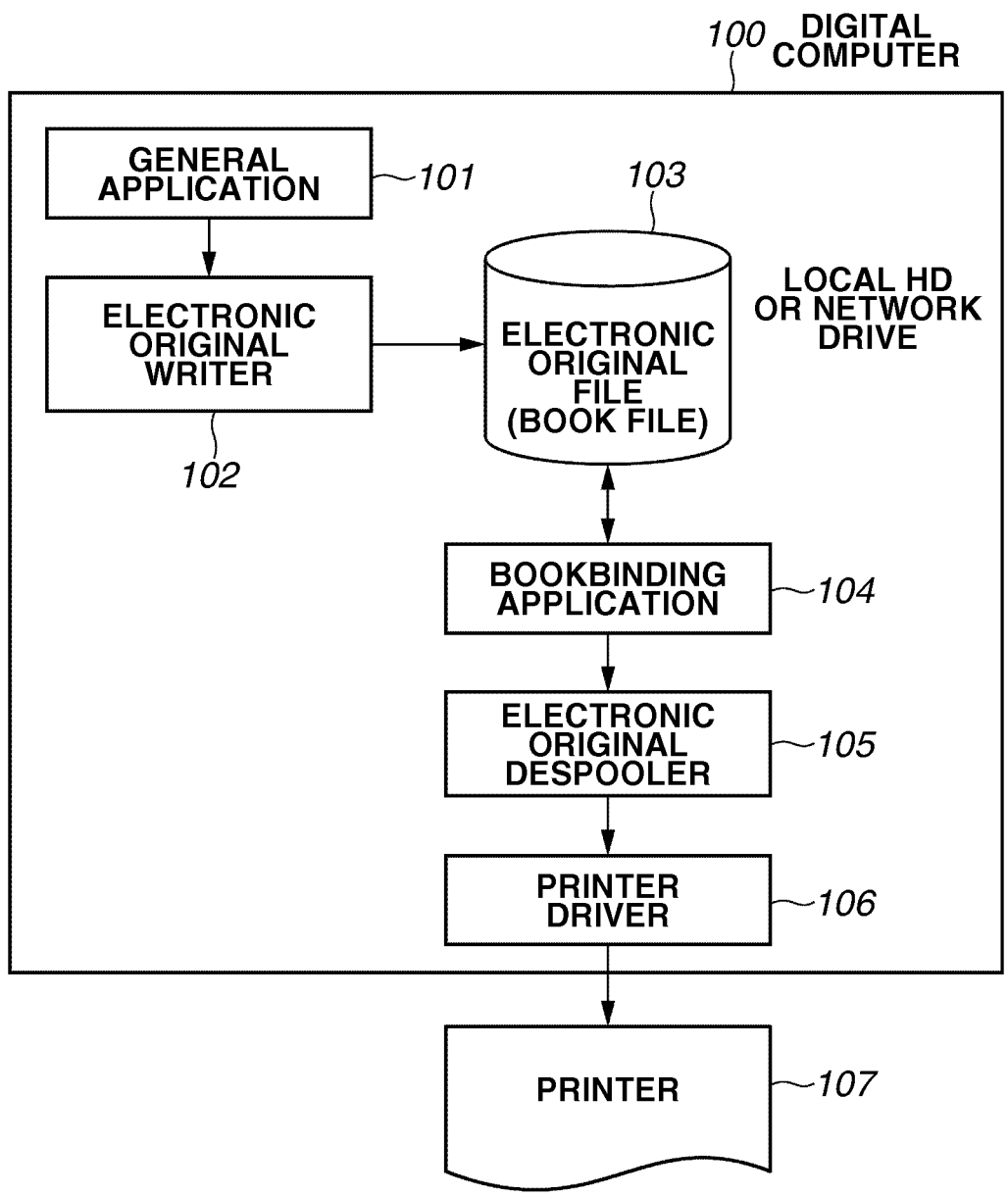
FIG. 1 is a block diagram illustrating an example of a configuration of a standalone document processing system according to an exemplary embodiment of the present invention.

FIG. 1 illustrates an example of a software configuration of a document processing system that can be employed for an information processing system according to an exemplary embodiment of the present invention. The document processing system can be realized by a digital computer 100, which is an example of an information processing apparatus according to the present exemplary embodiment.

A general application 101 is an application program that may provide various functions, such as, word processing, spreadsheet, photo retouch, draw or paint, presentation, and text editing. The general application 101 may also have a print function.

When a user instructs printing of generated application data, such as document data and image data, the general application program may use a predetermined interface provided by an operating system (OS). More specifically, to print generated data, the general application 101 can transmit an output command (which is referred to as "GDI function") having a predetermined OS-dependent format to an output module of the OS that provides the above-described interface.

The output module receives the output command and converts the received output command into data having a format that can be processed by a printer or by another output device. The output module outputs a converted command (referred to as Device Driver Interface (DDI) function). The format that the output device can process is dependent on the type of each device, each manufacturer, and each machine model. Therefore, a device driver can be provided for each device. The OS converts the command using the device driver and generates print data.

When the OS is the Windows® provided by Microsoft Corporation, the above-described output module is referred to as Graphic Device Interface (GDI).

An electronic original writer 102, which is an improved type of the above-described device driver, can serve as a software module that can realize a document processing system according to the present embodiment. The electronic original writer 102 is not dedicated to a specific output device, and can perform conversion of data into an output command having a predetermined format so that a bookbinding application 104 or a printer driver 106 can process the output command. Thus, the electronic original writer 102 can generate an electronic original file 103.

The converted format obtained by the electronic original writer 102 (hereinafter, referred to as an "electronic original format") can be any format that can express original data on a page-by-page basis. For example, Portable Document Format (PDF) format provided by Adobe® Systems or Scalable Vector Graphics (SVG) format can be used as a standard electronic original format.

In one version, when the general application 101 uses the electronic original writer 102, the general application 101 may designate the electronic original writer 102 as an output device driver before instructing print processing.

In general, an electronic original file generated by the electronic original writer 102 does not have a perfect format as an electronic original file. Therefore, the bookbinding application 104 may designate the electronic original writer 102 as a device driver.

The bookbinding application 104 can manage the conversion of application data into an electronic original file. According to one embodiment, the bookbinding application 104 then completes an electronic original file so as to have a below-described format based on an incomplete electronic original file newly generated by the electronic original writer 102.

In the following description, to explicitly express the above-described features, a file generated by the electronic original writer 102 may be referred to as an "electronic original file" and an electronic original file having been completed by the bookbinding application 104 may be referred to as a "book file." If files are not specifically designated, then document files, electronic original files, and book files generated by applications may be simply referred to as document files (or document data).

As described above, application data can be converted into an electronic original format including pages (hereinafter, referred to as "logical pages" or "original pages") defined by the general application 101. The converted application data can be stored as the electronic original file 103 into a hard disk or other storage medium.

The hard disk can be, for example, a local drive of the computer that realizes the document processing system according to the present exemplary embodiment, or can be a network drive connected to a network.

In one embodiment, the bookbinding application 104 may import the "electronic original file" or "book file" 103 and enables users to edit the read file. However, the bookbinding application 104 may not provide any function for editing the contents of each page. In one version, the bookbinding application 104 enables users to edit the structure of a book or a chapter on a page-by-page basis.

When a user instructs printing of the book file 103 edited by the bookbinding application 104, the bookbinding application 104 activates an electronic original despooler 105.

In one version, the electronic original despooler 105 reads a designated book file from the hard disk and generates an output command adaptable to the above-described output module of the OS so as to print each page according to a format described in the book file. The electronic original despooler 105 outputs the generated command to the output module (not illustrated).

In this case, the electronic original despooler 105 designates the printer driver 106 as a device driver for a printer 107 used as an output device. The output module converts the output command into a device command and outputs the device command to the printer driver 106 to be used by the designated printer 107. Then, the printer driver 106 transmits the converted device command to the printer 107. The printer 107 prints an image based on the command.

Figure 2:
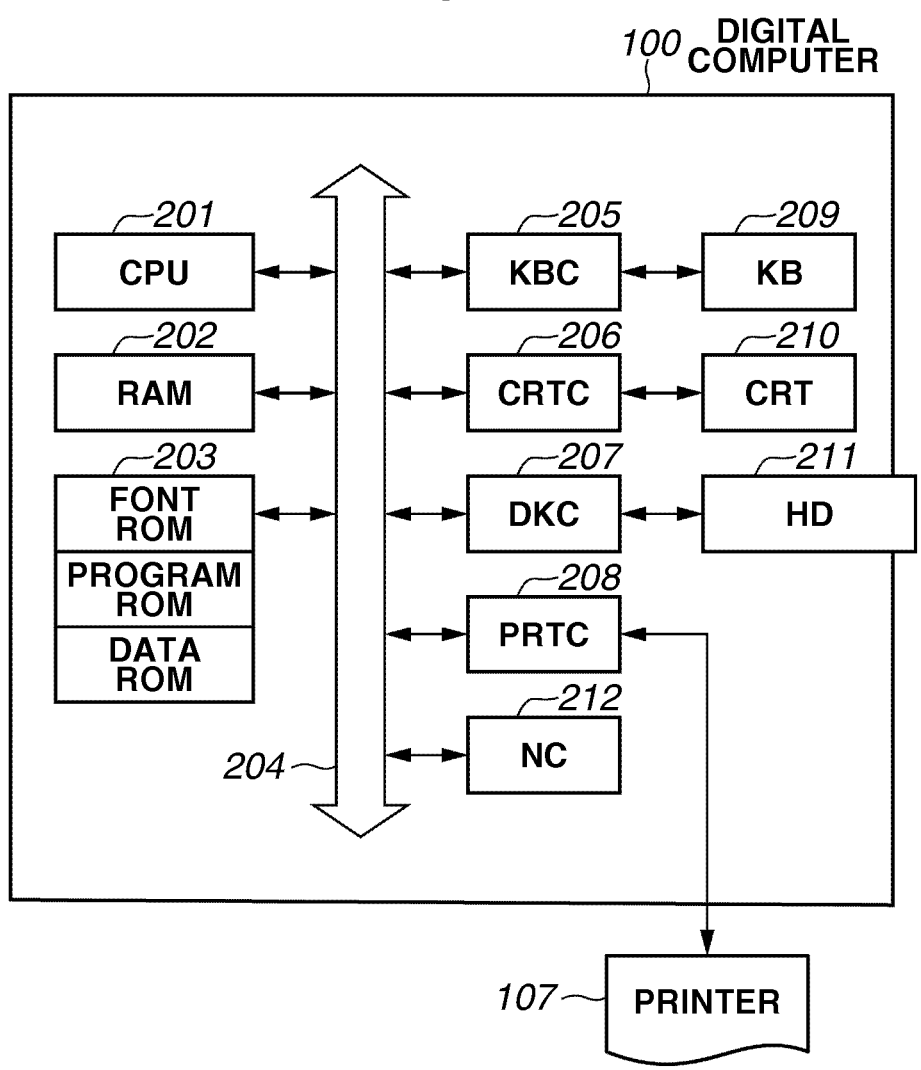
FIG. 2 is a block diagram illustrating an example of a configuration of a host computer of the document processing system according to an exemplary embodiment of the present invention.

FIG. 2 is a block diagram illustrating an example of a hardware configuration of the digital computer 100 illustrated in FIG. 1. In the embodiment illustrated in FIG. 2, the digital computer 100 includes a central processing unit (CPU) 201 that can execute various programs including the OS, the general application 101, and the bookbinding application 104 that are stored in a read only memory (ROM) area of a ROM 203 or loaded into a random access memory (RAM) 202 from a hard disk 211.

The digital computer 100 having the above-described hardware configuration can realize the software configuration illustrated in FIG. 1 and also can perform processing according to procedures of flowcharts described below. The RAM 202 is capable of functioning as a main memory and a work area for the CPU 201.

A keyboard controller (KBC) 205 can control any key input that may be entered via a keyboard 209 or a pointing device (not illustrated). A cathode ray tube (CRT) controller (CRTC) 206 can control a display operation to be performed by a display unit 210. The display unit 210 is not limited to the CRT and can be a liquid crystal display device or a plasma display device.

A disk controller (DKC) 207 can control any access to a hard disk (HD) 211 or a floppy disk (FD) (not illustrated). The hard disk (HD) or the floppy disk (FD) (not illustrated) can store, for example, a boot program, various applications, font data, user files, and editing files.

A printer controller (PRTC) 208, which is connected to the printer 107, can control signals sent to or received from the connected printer 107. A network controller (NC) 212, connected to a network, can execute communication control processing when the digital computer 100 communicates with other devices connected to the network.

Prior to a detailed description of the bookbinding application 104, an example data format of the above-described "book file" is described below. The book file has a three-layer structure resembling a book composed of papers. One book file can include a plurality of elements constituting a hierarchical structure. An upper layer is referred to as a "book" resembling a single book, which can define attributes relating to the entire book. An intermediate layer, subordinated to the upper layer, is referred to as a "chapter" that corresponds to a chapter of the book.

Each "chapter" can define attributes of each chapter. A lower layer is referred to as a "page" that corresponds to each page defined by an application program. Each "page" can define attributes of each page. One "book" can include a plurality of "chapters." One "chapter" can include a plurality of "pages."

Figure 3A:
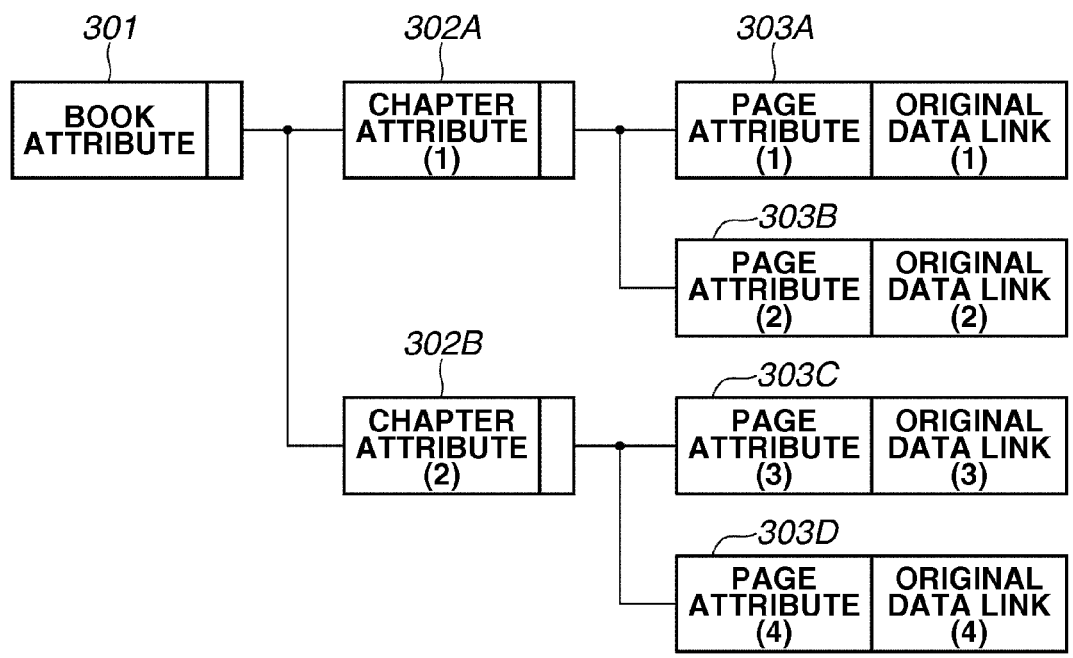

FIG. 3A illustrates an example of a format of the book file including a book, chapters, and pages denoted by corresponding nodes according to the present exemplary embodiment. One book file includes one "book." Both the "book" and the "chapter" are the concept that defines a book structure (i.e., a hierarchical structure) and includes defined attribute values and a link to a lower layer as its entity.

The "page" includes data for each page generated by the application program as its entity. Therefore, the "page" includes the entity of an original page (i.e., original page data) and a link to each original page data, in addition to its attribute values.

A print page output to a paper medium may include a plurality of original pages. The structure of each print page is not displayed with a link and displayed as a part of the attributes for the "book", the "chapter", or the "page."

In FIG. 3A, a book 301 defines its attributes (book attributes) and includes two chapters 302A and 302B linked together. The chapter 302A includes two pages 303A and 303B linked together. The page 303A defines attribute values (1) and includes a link to corresponding original page data (1). The page 303B defines attribute values (2) and includes a link to corresponding original page data (2). The original page data is the entity of each page.

Figure 3B:

Similarly, the chapter 302B includes two pages 303C and 303D linked together. The page 303C defines attribute values (3) and includes a link to corresponding original page data (3). The page 303D defines attribute values (4) and includes a link to corresponding original page data (4). FIG. 3B illustrates example original page data 304 including the original page data (1) to (4) representing the entities of pages 303A, 303B, 303C and 303D.

FIG. 4 illustrates an example of setting items relating to the book attributes, chapter attributes, and page attributes according to the present exemplary embodiment. The attributes illustrated in FIG. 4 can be set for respective hierarchical elements, i.e., the book, the chapter, and the page. An item, if defined in both upper and lower layers, describes its effective attribute value in the lower layer. Therefore, an item involved only in the book attributes has an attribute value that is valid in the entire book. However, an item defined in both the book attributes and a lower layer has a valid content being set for the book attributes. In the example illustrated in FIG. 4, each item may not correspond to a single item and may include a plurality of relevant items.

The attributes illustrated in FIG. 4 are mere examples. Any other attributes can be arbitrarily set.

The "book file", i.e., an electronic original file having a structure given by the above-described bookbinding application 104, has the above-described structure and contents. Next, an example of a procedure for generating a book file, which can be executed by the bookbinding application 104 and the electronic original writer 102, is described below. The bookbinding application 104 can perform the generation of the book file as a part of a book file editing operation.

Figure 5:
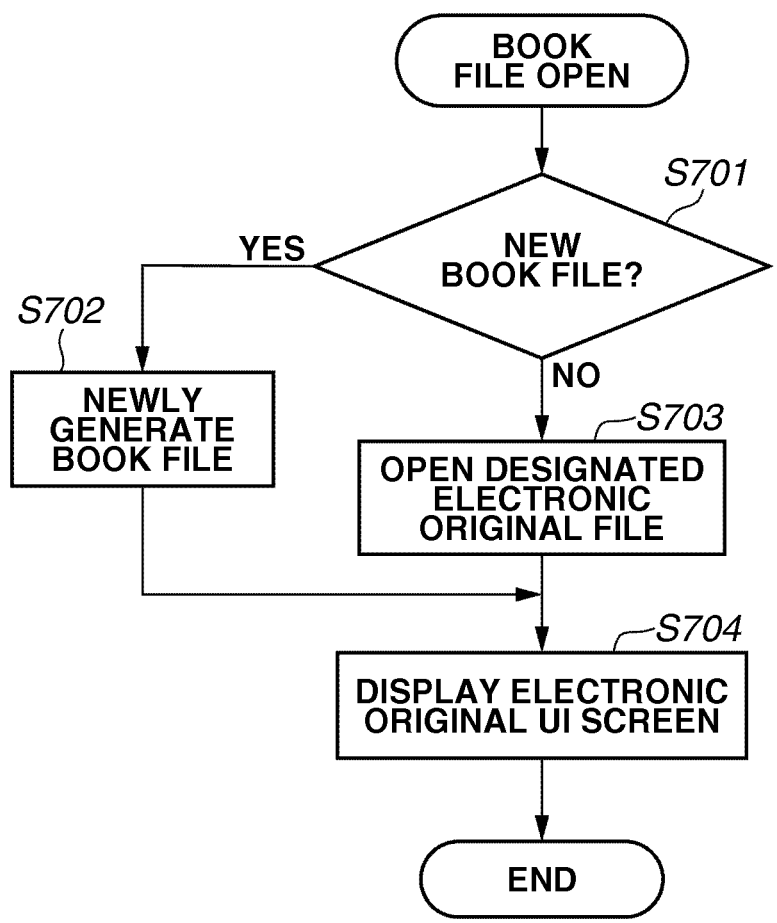
FIG. 5 is a flowchart illustrating an example of a procedure for opening a book file according to an exemplary embodiment of the present invention.

FIG. 5 is a flowchart illustrating an example of a procedure for opening a book file by the CPU 201 that can execute the bookbinding application 104 according to the present exemplary embodiment.

First, in step 5701, the bookbinding application 104 determines whether a book file to be opened is a newly generated file or an already existing file. If it is determined that the book file to be opened is a file newly generated (YES in step S701), the bookbinding application 104 proceeds to step 5702. In step 5702, the bookbinding application 104 generates a new book file that does not include any chapter.

According to the example illustrated in FIGS. 3A and 3B, the newly generated book file is a book node that includes only the book 301 and does not have any link to a chapter. In this case, the book attributes are a set of attributes that can be prepared beforehand for new generation. Then, the bookbinding application 104 proceeds to step S704. In step S704, the bookbinding application 104 causes the display unit 210 to display a user interface (UI) screen that enables users to edit the newly generated book file.

Figure 7:
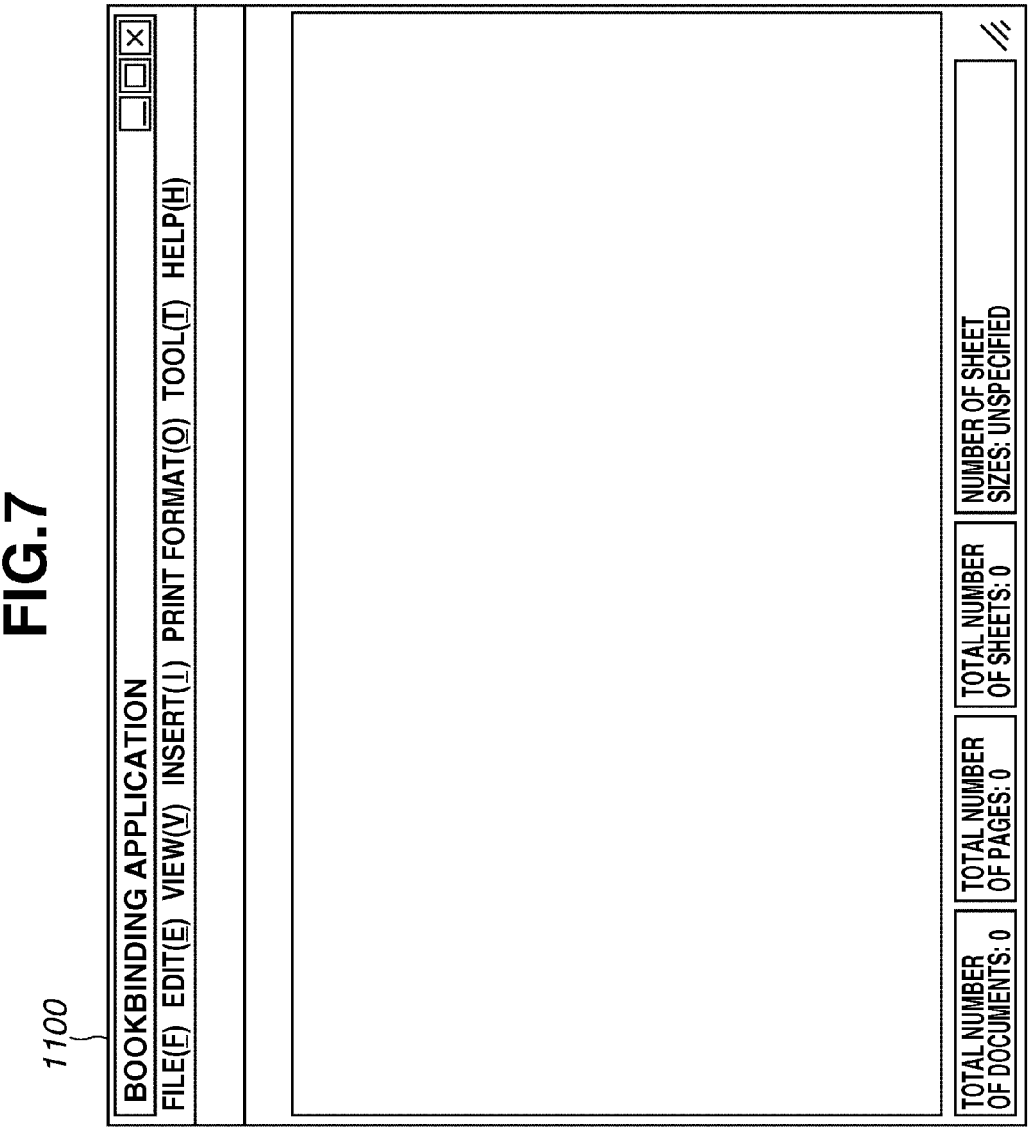
FIG. 7 illustrates an example of a UI screen to be displayed when a new book file is opened.

FIG. 7 illustrates an example of the UI screen to be displayed when a new book file is generated. In this case, the book file has no substantial contents. Therefore, a UI screen 1100 includes nothing to be displayed.

If it is determined that the opened book file is an existing file (NO in step S701), the bookbinding application 104 proceeds to step S703. In step S703, the bookbinding application 104 opens a designated book file and causes the display unit 210 to display a user interface (UI) screen according to the structure, attributes, and contents of the designated book file.

Figure 6:
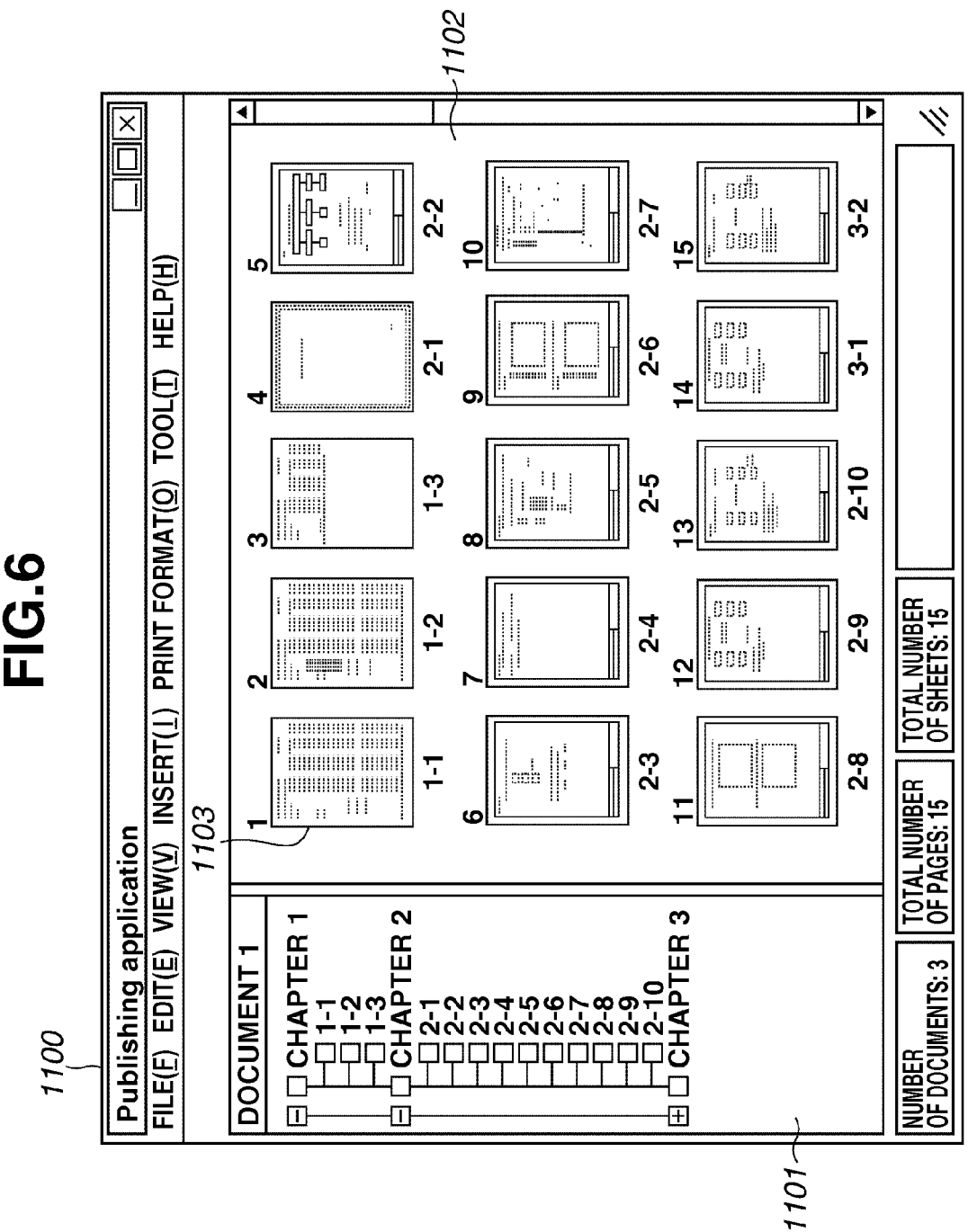
FIG. 6 illustrates an example of a user interface (UI) screen to be displayed when an existing book file is opened.

FIG. 6 illustrates an example of the UI screen that can be displayed in step S703. The UI screen 1100 includes a tree section 1101 that indicates a book structure (i.e., a hierarchical structure) and a preview section 1102 that displays a state of printed pages. The tree section 1101 can display all chapters included in the book and pages included in each chapter to form a tree structure as illustrated in FIG. 3A. A page number displayed in the tree section 1101 corresponds to a page number of the original page. The preview section 1102 can display reduced images of respective printed pages. The display order in the preview section 1102 reflects the structure of a book.

The electronic original writer 102 can add, as a new chapter, application data having been converted into an electronic original file to the opened book file. This function can be referred to as an "electronic original importing function." When a book file is newly generated according to the procedure of the flowchart illustrated in FIG. 5, the electronic original can be imported to the book file to give its entity. This function can be activated by a drag-and-drop operation performed on the application data displayed on the screen illustrated in FIG. 6.

Figure 8:
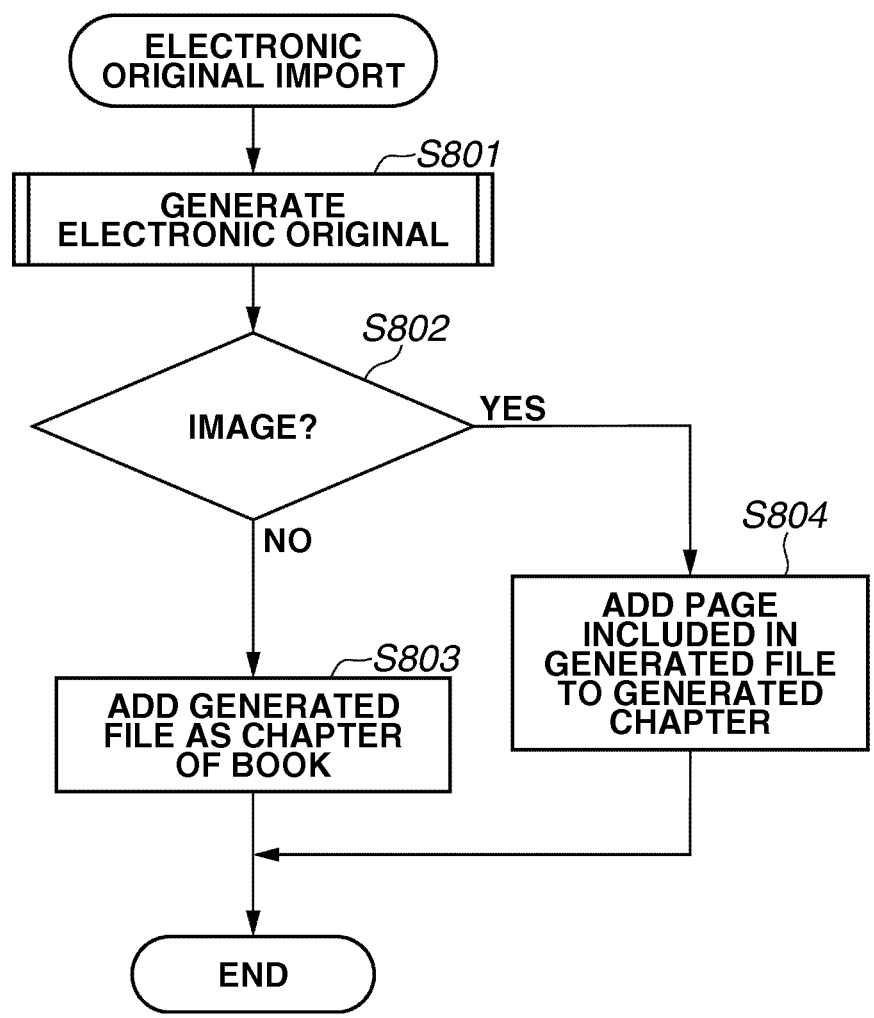
FIG. 8 is a flowchart illustrating an example of a procedure for importing an electronic original file to a book file according to an exemplary embodiment of the present invention.

FIG. 8 is a flowchart illustrating an example of a procedure for importing an electronic original according to the present exemplary embodiment. First, when the bookbinding application 104 receives an electronic original, the bookbinding application 104 activates the general application 101 that has generated the designated application data. The bookbinding application 104 designates the electronic original writer 102 as a device driver to perform printing of the application data.

In step S801, the electronic original writer 102 converts the application data into electronic original data. After completing the conversion of the application data into the electronic original data, the bookbinding application 104 proceeds to step S802. In step S802, the bookbinding application 104 determines whether the converted data is image data.

The above-described determination can be performed based on a file extension attached to the application data if the OS is the Windows®. For example, if the extension is "bmp", the bookbinding application 104 can determine that the converted data is Windows® bitmap data. If the extension is "jpg", the bookbinding application 104 can determine that the converted data is JPEG compressed image data. If the extension is "tiff", the bookbinding application 104 can determine that the converted data is tiff format image data.

Furthermore, if the converted data is one of the above-described image data, an electronic original file can be directly generated based on the image data. Therefore, it is unnecessary to activate the application in step S801. The processing to be performed in step S801 can be omitted.

If it is determined that the converted data is not image data (NO in step S802), the bookbinding application 104 proceeds to step S803. In step S803, the bookbinding application 104 adds the generated electronic original file, as a new chapter, to a book of the presently opened book file. In this case, if the chapter attributes and the book attributes are commonly usable, the bookbinding application 104 uses copied book attribute values as the chapter attributes. On the other hand, if the chapter attributes and the book attributes are not commonly usable, the bookbinding application 104 sets predetermined values prepared beforehand as the chapter attributes.

If it is determined that the converted data is image data (YES in step S802), the bookbinding application 104 proceeds to step S804. The bookbinding application 104 basically does not add any new chapter. Instead, the bookbinding application 104 adds each original page included in the electronic original file generated in step S801 to the designated chapter.

However, if the book file is a newly generated file, a new chapter is generated and each page of the electronic original file is added as a page belonging to this chapter. In this case, if the page attributes and the upper layer attributes are commonly usable, the bookbinding application 104 uses the upper layer attributes as the page attributes.

If the attribute values defined by the application data are continuously used for the electronic original file, the bookbinding application 104 uses the attribute values defined by the application data as the page attributes.

For example, if "N-up print designation" is designated in the application data, its attribute values can be continuously used. In this manner, a new book file is generated or a new chapter is added.

Figure 9:
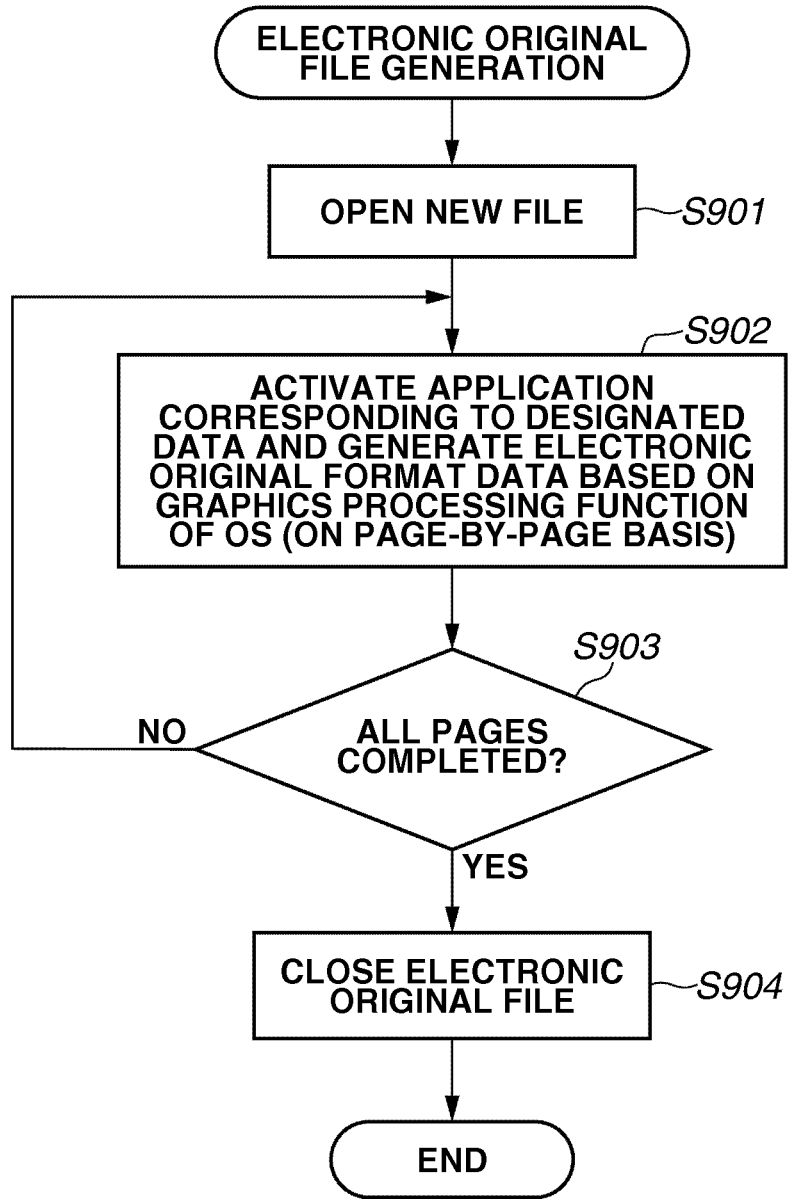
FIG. 9 is a flowchart illustrating an example of a procedure for converting application data into an electronic original file according to an exemplary embodiment of the present invention.

FIG. 9 is a flowchart illustrating an example of a procedure for generating the electronic original file in step S801 of FIG. 8, which can be performed by the electronic original writer 102.

First, in step S901, the bookbinding application 104 newly generates an electronic original file and opens the generated electronic original file. Next, the bookbinding application 104 proceeds to step S902. In step S902, the bookbinding application 104 activates an application corresponding to the designated application data.

The bookbinding application 104 designates the electronic original writer 102 as a device driver and transmits an output command to an output module of the OS. The output module causes the electronic original writer 102 to convert the received output command into electronic original format data, and outputs the converted data to the electronic original file opened in step S901.

Next, the bookbinding application 104 proceeds to step S903. In step S903, the bookbinding application 104 determines whether the conversion of the designated data has been completed for all pages. If it is determined that the conversion of the designated data has been completed (YES in step S903), the bookbinding application 104 proceeds to step S904. In step S904, the bookbinding application 104 closes the electronic original file. The electronic original file generated in this manner by the electronic original writer 102 is a file that includes the entity of the original page data illustrated in FIG. 3B.

As described above, the present exemplary embodiment can generate a book file based on application data. The present exemplary embodiment may allow users to perform the following editing operations for each chapter and each page of a book file generated based on application data as described above.

(1) new addition
(2) deletion
(3) copy
(4) cut
(5) paste
(6) move
(7) change of chapter name
(8) renumber/rename of page
(9) cover insertion
(10) interleaf insertion
(11) index sheet insertion
(12) page layout relative to each original page The present exemplary embodiment allows users to cancel an editing operation in a case where the editing operation has been previously set, or allows users to instruct execution of a previously canceled operation. In short, the editing functions according to aspects of the present exemplary embodiment enable users to perform various operations including, for example, integration of a plurality of book files, relocation of chapters and/or pages in a book file, deletion of the chapters and/or pages in the book file, layout change of an original page, and insertion of an interleaf or an index sheet.

If a user performs the above-described operations, the system according to the present exemplary embodiment may reflect a operation result to the attributes illustrated in FIG. 4 or may change the structure of a book file. For example, if a user instructs addition of a new blank page, the system according to the present exemplary embodiment can insert a blank page at a designated portion.

The inserted blank page can be regarded as an original page. If a user changes the layout of an original page, the system according to the present exemplary embodiment reflects the changed contents as a part of the attributes (e.g., print method, N-up printing, front cover/back cover, index sheet, interleaf, and chapter break). Examples relating to the display and operations in the editing processing according to an exemplary embodiment are described below in more detail.

A book file having been generated and edited as described above can be printed as a final output. In one version, if a user selects a file menu from the UI screen 1100 of the bookbinding application illustrated in FIG. 6 and designates printing of the selected file name, a designated output device (e.g., the printer 107) prints the selected file.

In this case, the bookbinding application 104 may generate a job ticket based on the presently opened book file and transmit the generated job ticket to the electronic original despooler 105. The electronic original despooler 105 can receive the job ticket and convert the received ticket into an output command of the OS (e.g., GDI command of Windows®) and can transmit the output command to an output module (e.g., GDI). The output module generates a command suitable to the output device using the designated printer driver 106 and transmits the generated command to the output device.

The document processing system according to the present exemplary embodiment is the above-described standalone document processing system. However, the present invention is not limited to the standalone document processing system and can be also applied to a server/client system that is an expanded or enhanced version of the standalone type.

As described above, when the bookbinding application 104 opens a book file, the UI screen 1100 illustrated in FIG. 7 is displayed on the display unit 210. A tree illustrated in the tree section 1101 represents a structure of the opened book (hereinafter, referred to as an "attentional book"). The present exemplary embodiment prepares a total of three display methods for the preview section 1102, which can be selected according to, for example, a user's designation.

A first display method is referred to as an "original view mode" which directly displays reduced images of original pages belonging to the attentional book, although the display in the preview section 1102 does not reflect the layout.

A second display method is referred to as a "print view mode" which displays original page images in the preview section 1102 that reflects the layout of the original pages. A third display method is referred to as a "simple print view mode" which does not display the contents of each original page in the preview section 1102 although the layout is reflected.

A user can change the print settings by selecting a "print format" from a menu field on the screen illustrated in FIG. 6. In the present exemplary embodiment, the user can selectively change page, chapter, and book settings. Then, if the user selects a setting object to be changed, the screen illustrated in FIG. 6 displays attributes of the selected setting object. For example, if the book is selected, a screen that enables the user to change a print setting item included in the book attributes is displayed.

If settable items are variable depending on the selected setting object, the screen displays different setting items for each setting object. Then, if the user operates to instruct on the displayed screen, the user can input desired print settings for respective items. The CPU 201 stores the print settings entered by the user as a part of respective attributes for each designated setting object.

In a case where an item is commonly settable for a plurality of setting objects, the user designates the item as "exception setting" at a lower-layer setting object and then inputs an attribute value for the item.

For example, if the user designates a "paper orientation" as an exception setting of the book at the chapter (i.e., the lower-layer setting object subordinated to the book), the user selects the "print format" from the menu illustrated in FIG. 6 and then selects a "designation of chapter" from a sub menu. The user further designates the "exception setting" for the "paper orientation" on the displayed UI screen. Then, the user sets a desired paper orientation for the selected chapter.

The CPU 201 performs exception setting for the selected setting object based on the above-described user's operation and sets contents of respective items. In the following description, the contents of an item included in the setting object which is designated as the exception setting can be referred to as exception setting contents.

In one version of the present exemplary embodiment, the designation of the exception setting is performed for each item included in the setting object. However, in another version, the designation of the exception setting can be performed for each setting object.

As described above, users can independently set desired values as print settings for each of the book, chapter, and page attributes even in a document editing operation. In the present exemplary embodiment, the above-described print setting procedure is a mere example. Any other procedure can be employed in an exemplary embodiment of the present invention if setting values can be reflected to the attributes illustrated in FIG. 4 and further reflected to a print result.

A template function that can be provided by the bookbinding application 104 is described below. As described above, the bookbinding application 104 can perform setting and editing with respect to the output sheet, the page layout, and the bookbinding on an electronic original file generated via the electronic original writer 102.

The above-described function of the bookbinding application 104 can be used to generate a document file having the attributes illustrated in FIG. 4. Further, the bookbinding application 104 provides a function for registering the setting information as a template to enable users to select a preferred template from a plurality of templates prepared beforehand when a document is newly generated.

The above-described template data can be registered in a registry of a client PC and can be managed by the client PC. The bookbinding application 104 provides an editing function for enabling users to arbitrarily change the template data. The registry is a file that can store environmental settings for various applications and driver designation information.

In the Windows® operating system, the template data is stored as a binary file. Therefore, a general text editor cannot change the template data. Therefore, the bookbinding application 104 has a function for reading the binary file and displaying the read file data as editable data to enable the users to perform an editing operation.

Further, the bookbinding application 104 has a function of storing template information as a file. The bookbinding application 104 further provides an import/export function for transmitting template files to other PCs and receiving template data from other PCs.

Figure 10:
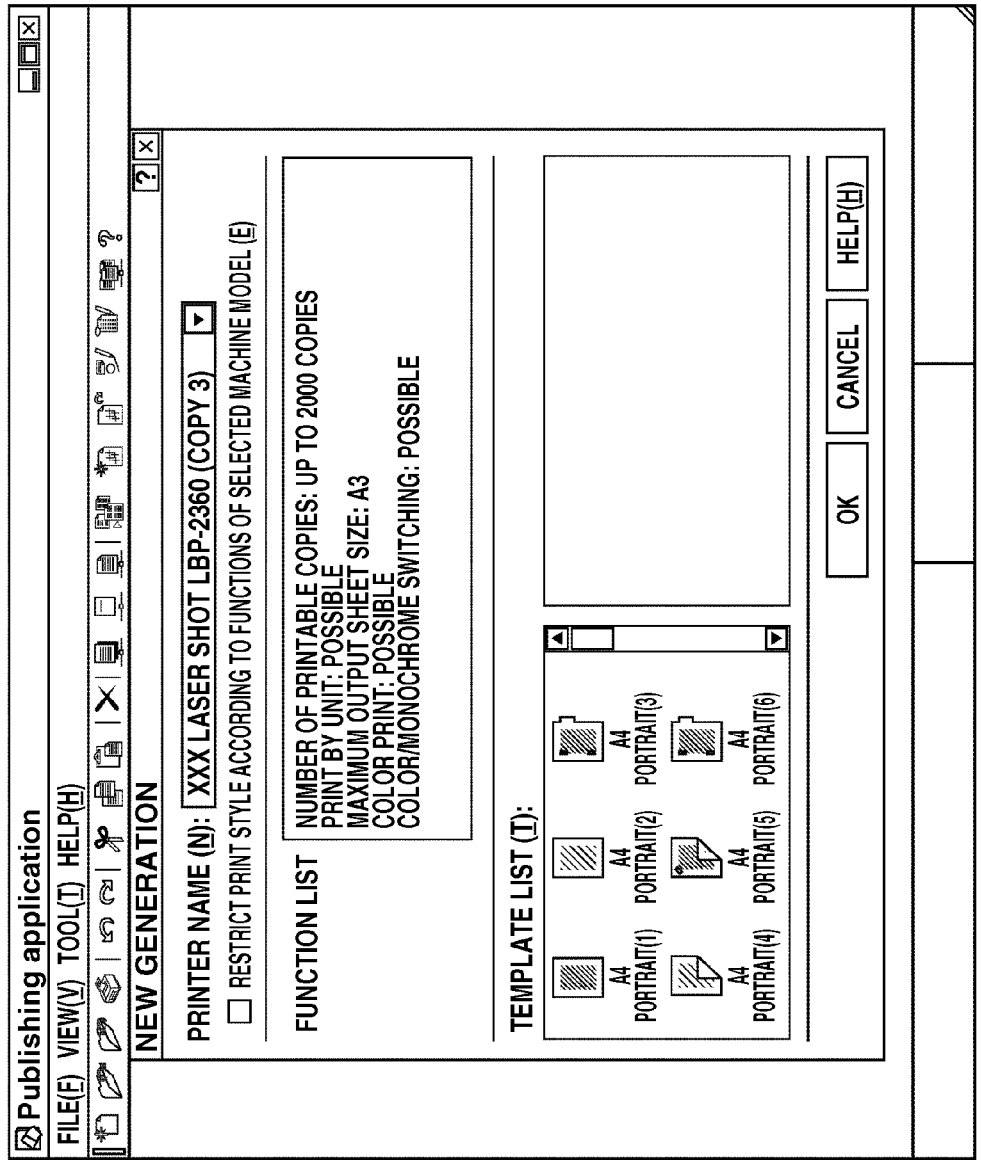
FIG. 10 illustrates an example of a UI screen to be displayed for a conventional template selection in the document processing system according to an exemplary embodiment of the present invention.

FIG. 10 illustrates an example of a UI screen to be displayed by the bookbinding application 104 for a template selection when a document file is newly generated. The UI screen illustrated in FIG. 10 enables users to select a desired template among a plurality of templates prepared beforehand by the bookbinding application 104. If a template is selected by a user's operation, the CPU 201 applies the setting contents registered as template contents to the document file (i.e., an editing object).

Figure 11:
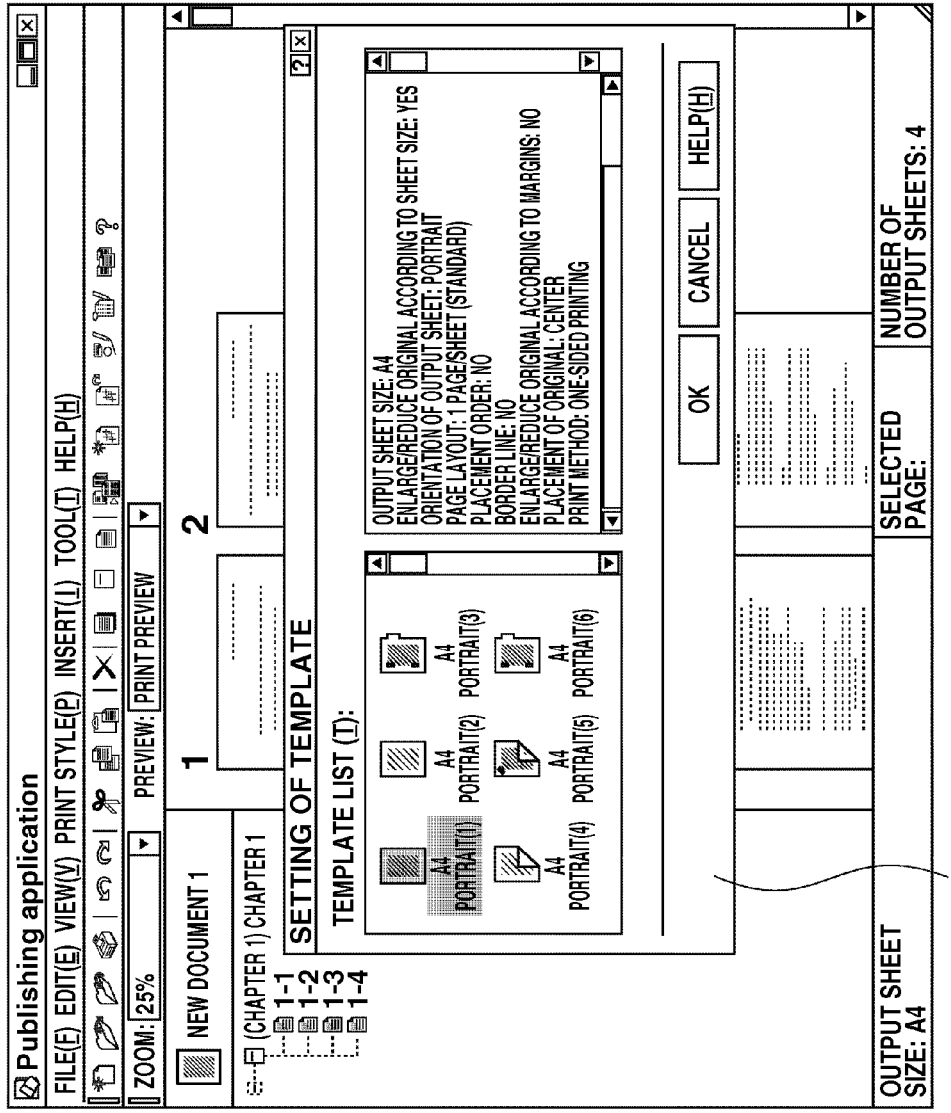
FIG. 11 illustrates an example of a UI screen to be displayed for a conventional template selection in the document processing system according to an exemplary embodiment of the present invention.

FIG. 11 illustrates an example of a "template selection" window 1501, which can be displayed for enabling users to select a new template when the document file is edited by the bookbinding application 104. Namely, users can change the present template to another template on the window 1501 while the bookbinding application 104 performs an editing operation.

Further, the "template selection" window 1501 enables users to generate a new template and register the generated template. In this case, if a template is selected by a user's operation, the CPU 201 applies the setting contents registered as template contents to the document file (i.e., the editing object).

Figure 12:
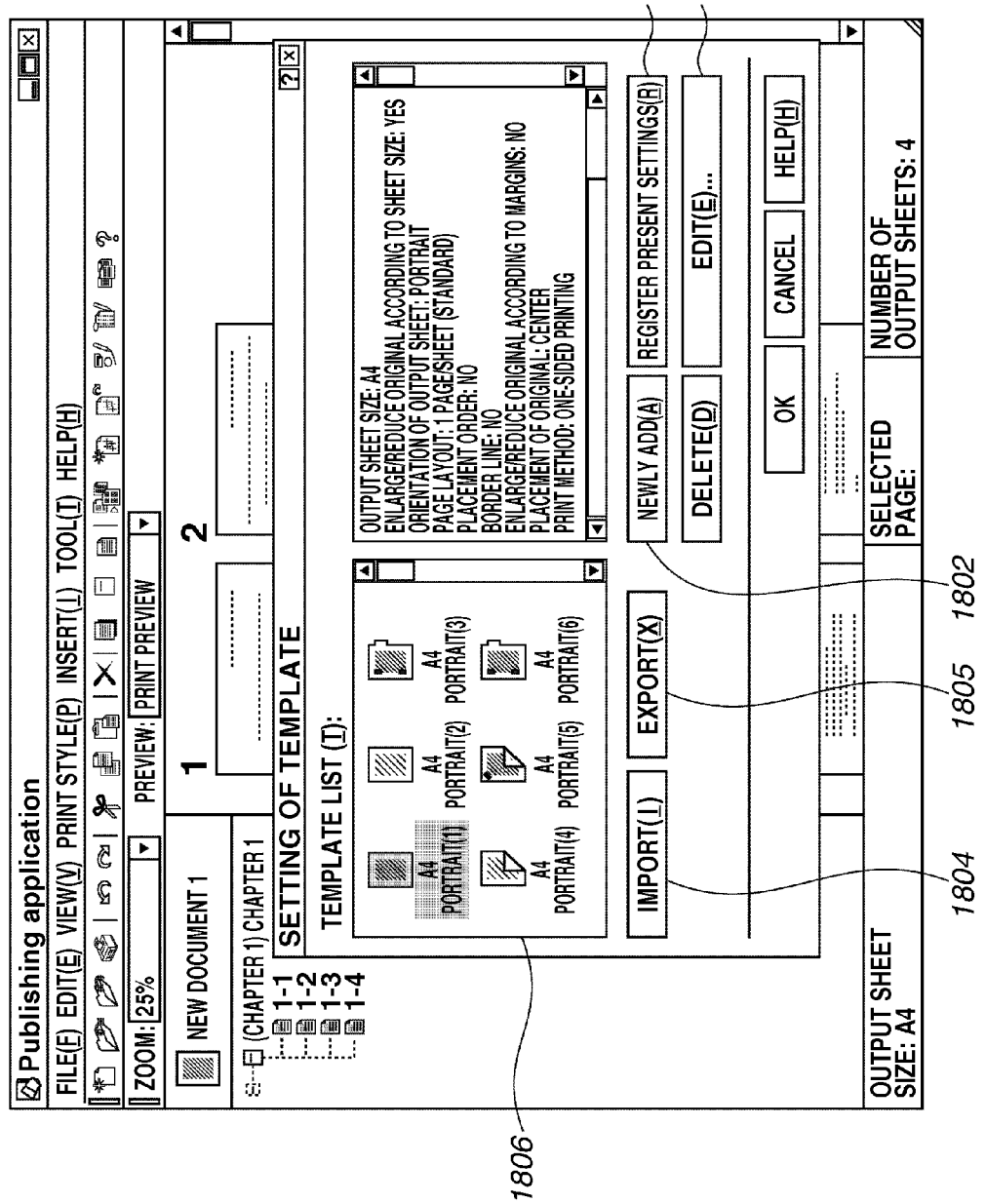
FIG. 12 illustrates an example of a UI screen that can be selected for a template setting in the document processing system according to an exemplary embodiment of the present invention.

Next, a conventional template setting is described below. FIG. 12 illustrates an example display of a "template setting" window that can be used when the bookbinding application 104 performs a template editing operation.

A list display field 1806 displays a list of templates that can be provided by the bookbinding application 104. If a user selects a desired template and clicks an "editing" button 1803, the display unit 210 displays a template editing screen illustrated in FIG. 13. The template editing screen illustrated in FIG. 13 enables the user to freely change the settings of the selected template.

Further, if the user clicks a "newly add" button 1802, the display unit 210 also displays the "template editing" screen illustrated in FIG. 13. The template settings illustrated in FIG. 13 are default initial values (e.g., 1 UP, one-sided, and no finishing). The user can generate a new template by designating a new template name and changing individual setting contents. Further, the user can register the generated template on the client PC.

If the user selects an export button 1805 on the UI screen illustrated in FIG. 12, the template information registered as the registry of the client PC can be stored as a file. Further, if the user selects an import button 1804, a template file can be newly registered into the registry of the client PC.

If the user selects a "register present settings" button 1801, a template that uses the setting values of the document file currently edited can be generated.

Figure 14:
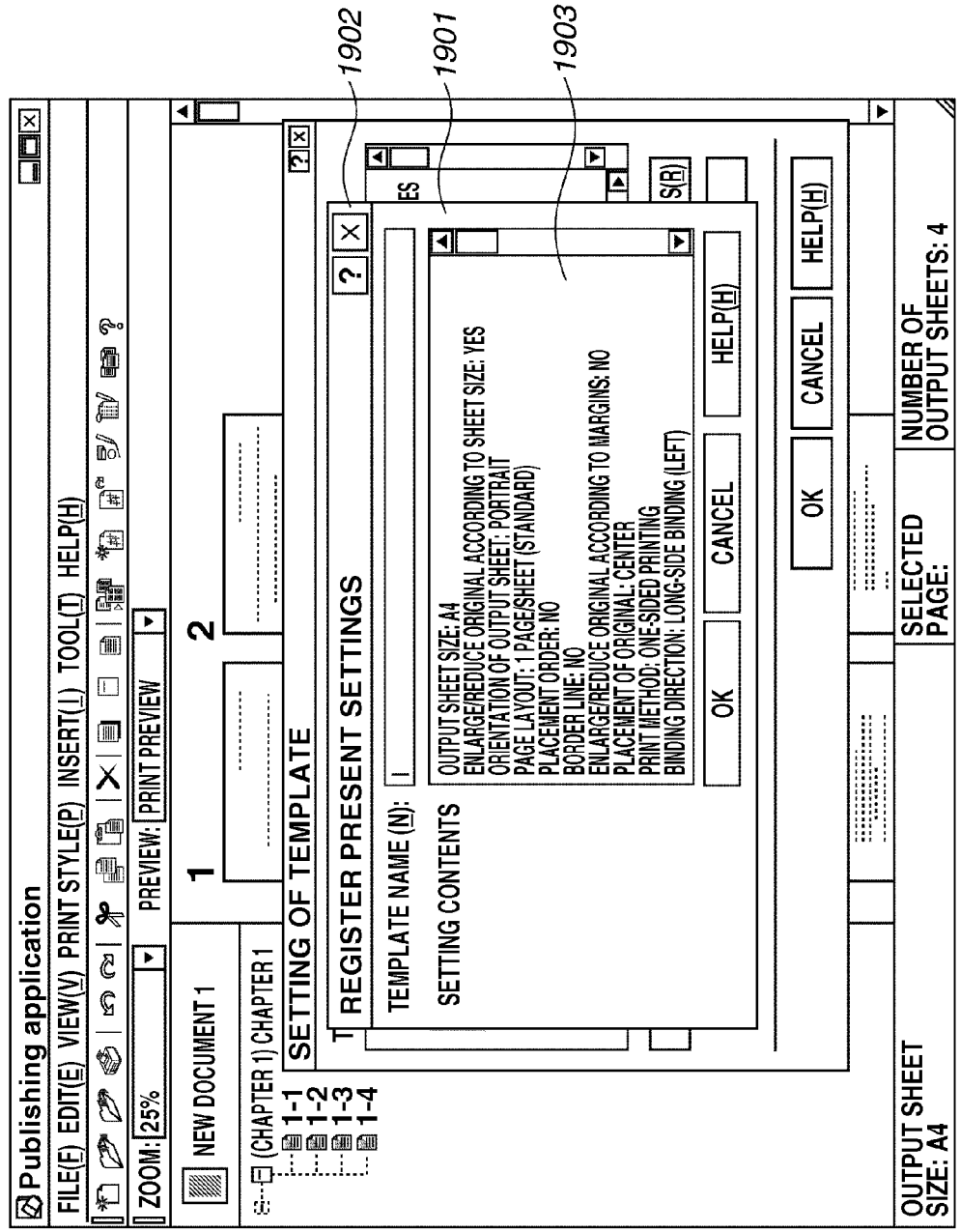
FIG. 14 illustrates an example of a UI screen that can be selected for a conventional template setting in the document processing system according to an exemplary embodiment of the present invention.

If the user clicks the "register present settings" button 1801, the display unit 210 displays a "register present settings" window 1902 illustrated in FIG. 14. In this case, the "register present settings" window 1902 includes a "setting content" display field 1903 that can display setting contents of the document file currently edited. The user can designate a template name 1901 to generate a template based on the settings of the document file currently edited.

As described above, the bookbinding application 104 can perform exception setting for switching the print settings of respective chapters and pages before the job is completed. However, the exception setting contents cannot be generally used for the template. Therefore, the available method is limited to a method for registering only the "book attributes" applied to the entire document file.

Next, a function for storing, into a template, the setting values of the document file currently edited that include the exception setting contents according to an exemplary embodiment of the present invention is described below.

In the present exemplary embodiment, the bookbinding application 104 performs the exception setting for each page. However, the bookbinding application 104 can perform the exception setting for each chapter.

Figure 17:
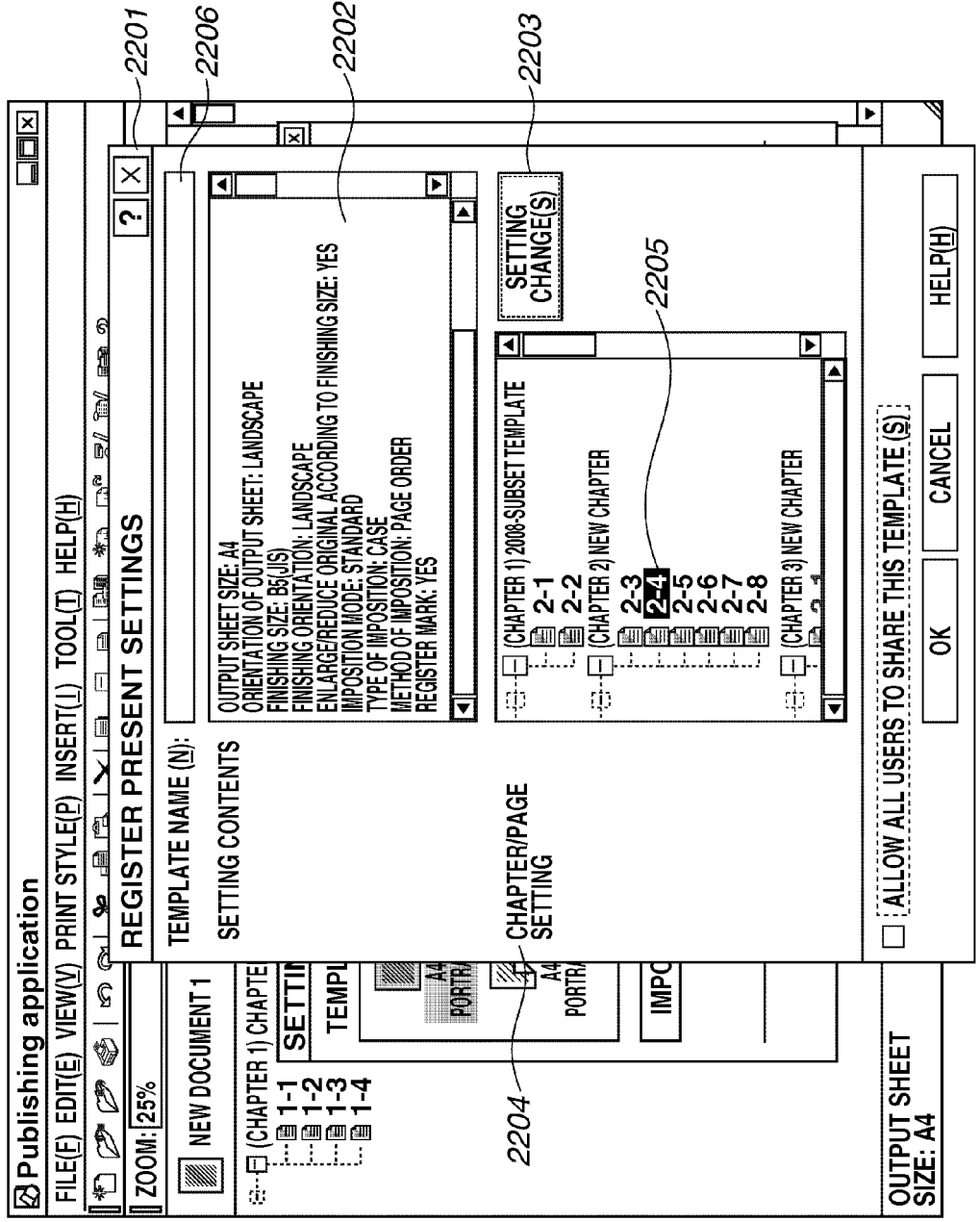
FIG. 17 illustrates an example of a UI screen that can be selected for the template setting in the document processing system according to an exemplary embodiment of the present invention.

FIG. 17 illustrates an example of a window 2201 that can be displayed instead of the "register present settings" window 1902 to be displayed when the "register present settings" button 1801 illustrated in FIG. 12 is pressed.

Figure 18:
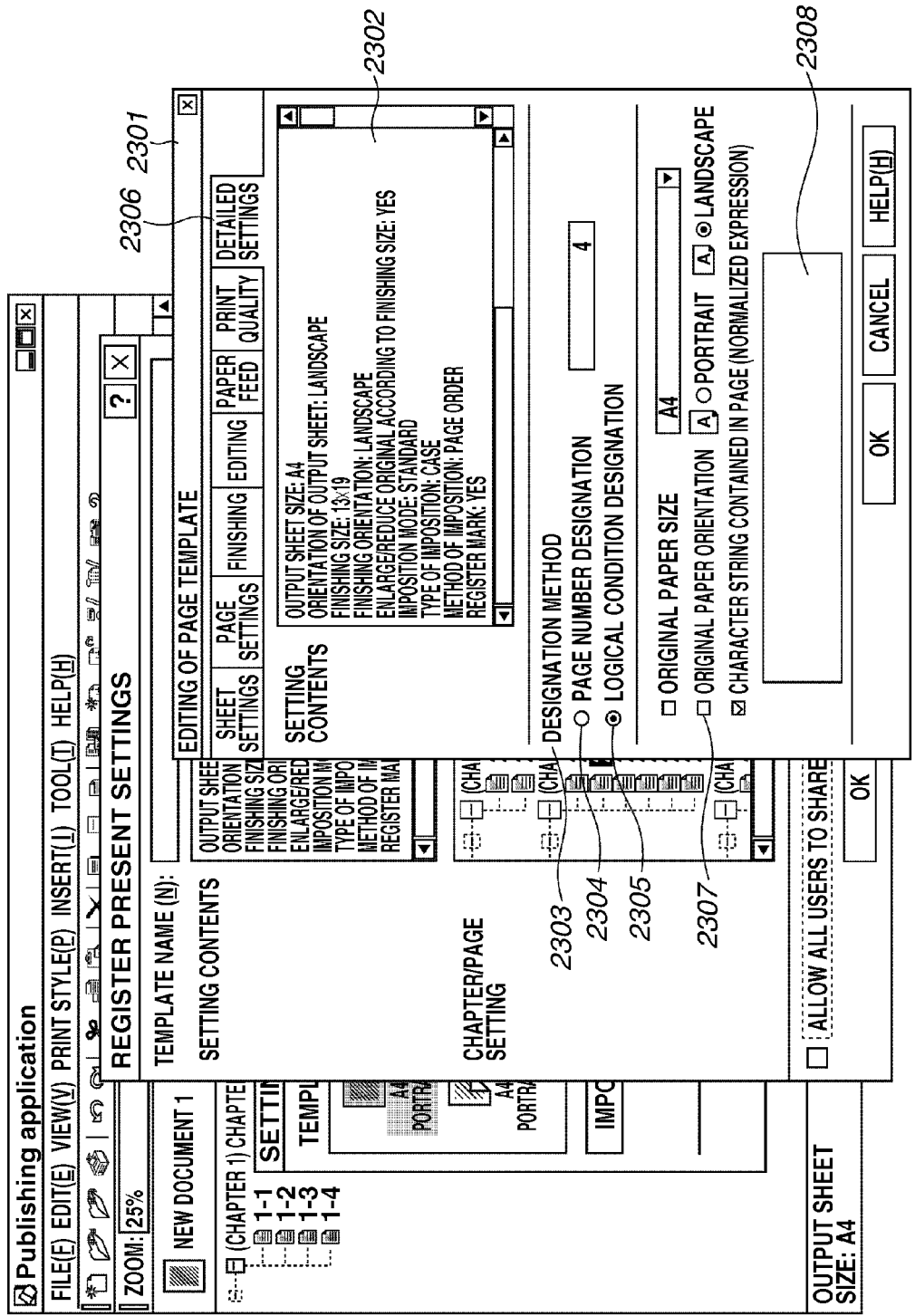
FIG. 18 illustrates an example of a UI screen that can be selected for the template setting in the document processing system according to an exemplary embodiment of the present invention.

Compared to the "register present settings" window 1902, the window 2201 includes a tree display section 2204 that indicates a structure of a book currently edited. The window 2201 displays an exception icon that indicates a page having been subjected to the exception setting. FIG. 17 illustrates a state where an icon 2205 indicating an exception page state is selected. If a setting change button 2203 is pressed in this state, a page template editing window 2301 illustrated in FIG. 18 can be displayed.

In this manner, using a different icon for discriminating each setting object having been subjected to the exception setting in a display control is useful to improve the usability for a user who generates a template. It may be further useful to change the design of each icon according to exception setting contents. It is further useful to open another window when an icon is selected, to display exception setting contents having been set for the setting object indicated by the selected icon.

Performing the above-described display control for displaying the setting object having been subjected to exception setting in association with the exception setting contents having been set for the setting object on the display unit is useful to improve the usability for a user who generates a template.

Although not illustrated, users can select one of setting tabs in the editing window 2301 to change changeable settings (i.e., exception setting contents) on a page-by-page basis. If a detailed setting tab 2306 is selected, exception setting contents can be confirmed in a setting display window 2302.

Further, a designation method field 2303 enables users to select a "page number designation" 2304 if it is desired to indicate the page position in a book as an immediate value or a "logical condition designation" 2305 if it is desired to designate application conditions for an allocated page.

If the page number designation 2304 is selected, the setting contents can be stored in a template in association with a page number. Therefore, users can generate a template that is effective when an original having a fixed page configuration is input repetitively.

If a template that is not dependent on the page number is desired, users can select the "logical condition designation" 2305. When the "logical condition designation" 2305 is selected, users can designate application conditions for applying the exception setting contents by combining conditions relating to the exception setting contents, such as an original paper size, an original paper orientation, a character string (normalized expression) contained in a page.

In this exemplary embodiment, the "original paper size" and the "original paper orientation" 2307 are values that can be designated by the general application 101 when an original is input by the electronic original writer 102.

If the "character string contained in page" is selected, users can input a character string using the following normalized expressions in a character string input window 2308.

Example of Normalized Expression:
^ match to head of line
$ match to tail of line
X|Y match to X or Y (X and Y are normalized expressions)
[A-Z] match to any character between A and Z (A and Z are arbitrary characters)
[^A-Z] match to any character not included in A to Z
[ABC] match to any one of A, B, and C (A, B, and C are arbitrary characters)
[AABC] match to any character but A, B, and C
. match to an arbitrary character To easily perform the above-described settings, as an initial value for a "page number setting", it is desired to display a page number to which the exception setting has been set. Further, as initial values for "logical condition settings", it is desired that the CPU 201 is capable of extracting, from an original, conditions exclusively possessed by a page having been subjected to the exception setting (i.e., conditions that are different from those of other pages) and displaying the extracted conditions.

The above-described UI screen and the operation procedure enable users to register the settings of the document file currently edited as a template. Through the registration of the template, a data structure including the book attributes, the chapter attributes, and the page attributes illustrated in FIGS. 3A and 3B can be stored. Further, chapter and page exception setting information of the generated template can be diversely used. Moreover, users are not required to repetitively perform the same exception settings when the registered template is applied to new documents (i.e., document files serving as editing objects).

Next, an example of a processing procedure to be executed by the bookbinding application 104 according to the above-described operation and detailed contents of the template are described below.

The template can be regarded as one of the book attributes that include chapter attributes and page attributes. More specifically, setting items included in the template are substantially identical to the items contained in the example attributes illustrated in FIG. 4. Through the above-described operation, the book attributes including the chapter attributes and the page attributes of the document file currently edited, which has the structure illustrated in FIGS. 3A and 3B, can be read from the electronic original file 103. If necessary, the book attributes can be converted into data having a format storable in the registry and can be registered in the registry.

Figure 15:
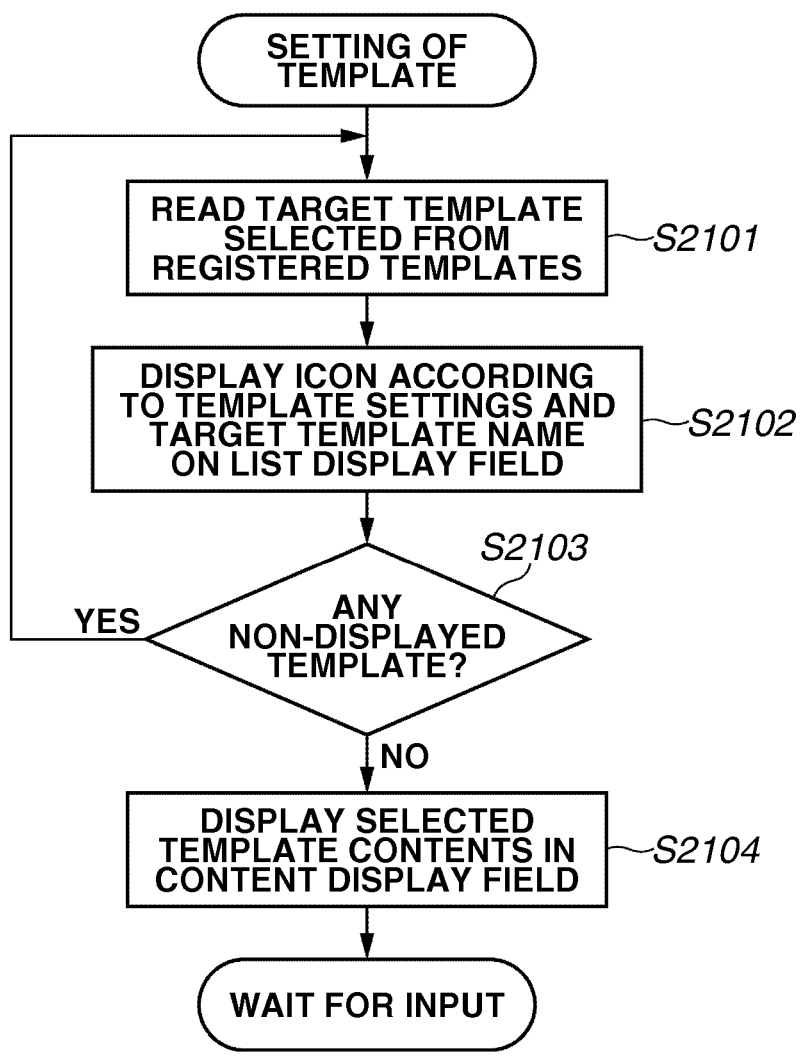
FIG. 15 is a flowchart illustrating an example of a template setting procedure that can be executed by a bookbinding application in the document processing system according to an exemplary embodiment of the present invention.

FIG. 15 is a flowchart illustrating an example of a template setting procedure that can be executed by the bookbinding application 104 when a user selects a template setting menu.

First, in step S2101, the bookbinding application 104 successively accesses a plurality of target templates registered beforehand according to a predetermined order and reads the contents of each target template. Then, in step S2102, the bookbinding application 104 displays the contents of the template (i.e., an icon representing the print settings and a target template name) in a template list display field.

The template list display field corresponds to a "template list" window illustrated in FIG. 12. The icon and the template name displayed in this case correspond to each icon displayed in the template list. For example, an icon intuitively representing the setting contents, such as "two-sided printing/one-sided printing", presence of "index sheet", and "paper orientation", can be selected and displayed.

The bookbinding application 104 successively repeats the above-described processing and, in step S2103, determines whether there is any non-displayed template. As each icon is linked with template data, a template corresponding to a selected icon can be determined unequivocally.

If it is determined that the display of the "template list" is finished (NO in step S2103), then in step S2104, the bookbinding application 104 displays the setting contents of the currently selected template in a content display field. The content display field is a display field located on the right side of the "template list" illustrated in FIG. 12.

The content display field can display detailed values about the setting items contained in the selected template, which correspond to the attribute items illustrated in FIG. 4. According to the example illustrated in FIG. 12, the setting values for the selected template, which is named as "A4 portrait (1)", include A4 in paper size, portrait in paper orientation, and one page/sheet in the page layout (N-up printing in FIG. 4). These setting values are displayed in the content display field.

The bookbinding application 104 repeats the processing of step S2104 for a newly selected icon even in a case where the user selects a desired icon from the template list after the screen illustrated in FIG. 12 is displayed. The contents of a corresponding template can be displayed.

Next, an example of the processing for registering the present settings as a template is described below. If the "register present settings" button 1801 is pressed on the screen illustrated in FIG. 12, the bookbinding application 104 starts processing according to the flowchart illustrated in FIG. 16.

First, in step S2201, the bookbinding application 104 reads, from the electronic original file 103, setting contents of "book attributes including chapter and page attributes" set for the document (book) file currently edited. Then, in step S2202, the bookbinding application 104 displays the setting contents and displays an icon representing the setting contents in a window 2202 illustrated in FIG. 17.

In this display operation, the bookbinding application 104 further determines whether the exception setting is set for each setting object included in the document file. Then, the bookbinding application 104 differentiates an icon representing the setting object that is determined as having been subjected to the exception setting from an icon representing the setting object that is not determined as having not been subjected to the exception setting.

Next, the bookbinding application 104 waits for an input by the user. If the bookbinding application 104 confirms that the user has selected a chapter or a page and pressed the setting change button (YES in step S2203), then in step S2204, the bookbinding application 104 performs detailed settings for a chapter or page template. After completing the processing in step S2204, the bookbinding application 104 again waits for an input by the user. An example of the detailed template settings is described below.

If the OK button is pressed after a template name is input in the input-waiting state (YES in step S2205), then in step S2206, the bookbinding application 104 registers the template with the input template name in the registry. In the present exemplary embodiment, the bookbinding application 104 registers attributes that reflect the detailed settings performed in step S2204, which are applied to the setting contents having been read in step S2201, as a template.

The registry includes registry keys that are hierarchically configured and entry values corresponding to respective registry keys. Hence, for example, the bookbinding application 104 registers the template with a designated name as a sub key belonging to the registry key that corresponds to the bookbinding application. In this case, the bookbinding application 104 registers values corresponding to respective setting item names as the entry values.

If the OK button is pressed in a state where the template name is not input, the bookbinding application 104 requests an input. If a "cancel" button is pressed, the bookbinding application 104 discards the setting contents having been read and terminates the processing of the routine illustrated in FIG. 16.

Figure 16:
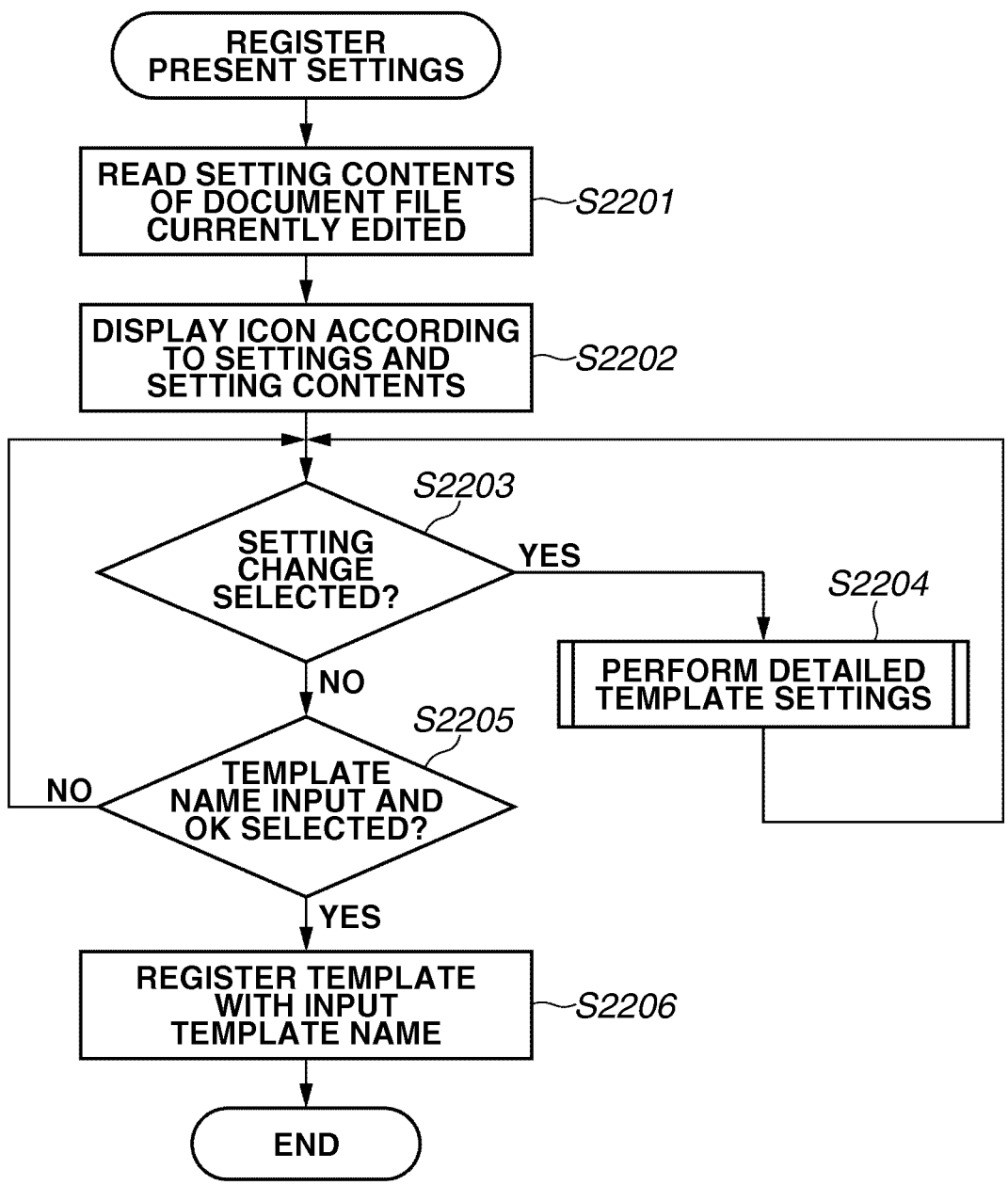
FIG. 16 is a flowchart illustrating an example of the template setting procedure that can be executed by the bookbinding application in the document processing system according to an exemplary embodiment of the present invention.
Figure 19:
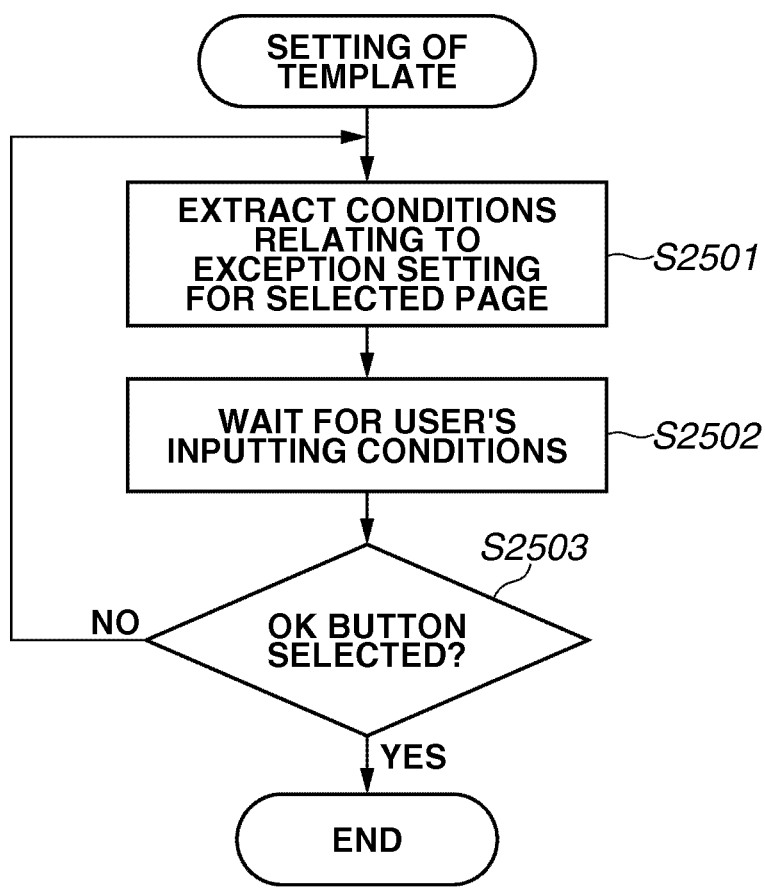
FIG. 19 is a flowchart illustrating the template setting procedure that can be executed by the bookbinding application in the document processing system according to an exemplary embodiment of the present invention.

Next, the detailed template setting processing (see step S2204) illustrated in FIG. 16 is described below in more detail with reference to FIG. 19. FIG. 19 is a flowchart illustrating an example of detailed template setting that can be executed by the bookbinding application 104.

In step S2501, the bookbinding application 104 extracts application conditions relating to the exception setting for the selected chapter or page in response to a selection of the setting change button by the user. The bookbinding application 104 displays the extracted application conditions on the editing window 2301 illustrated in FIG. 18.

In the present exemplary embodiment, to extract the application conditions, the bookbinding application 104 can use information contained in the above-described output command (i.e., the DDI function) that has been received by the electronic original writer 102 from the general application 101 via the GDI.

An interface capable of switching the print settings (e.g., paper size, paper orientation, paper feed stage, one-sided/two-sided printing, and color/monochrome printing) on a page-by-page basis is present in the DDI function. The electronic original writer 102 stores, on a page-by-page basis, the above-described information in the electronic original file 103. If the selected chapter or page includes any unique print setting value that is different from the values contained in other pages, the electronic original writer 102 extracts parameter information relating to the unique print setting value as the application conditions.

Next, in step S2502, the bookbinding application 104 waits for user's inputting conditions. Further, in step S2503, the bookbinding application 104 determines whether the OK button is pressed after the user selects the application conditions (e.g., the page number designation 2304 or the logical condition designation 2305) and inputs the contents of the application conditions, the bookbinding application 104 terminates the detailed template setting processing and returns to the processing illustrated in FIG. 16.

If the user selects the logical condition designation 2305, the bookbinding application 104 allows the user to input logical conditions. If the user selects the page number designation 2304, the bookbinding application 104 enables the user to change the page number of the book.

By executing the above-described detailed template setting, the bookbinding application 104 can register exception setting contents and application conditions relating to the exception setting contents as a template.

More specifically, the "template selection" window 1501 illustrated in FIG. 11 can be opened by designating a "selection of template" menu. A template icon representing the template registered according to the above-described procedure can be displayed in the "template selection" window 1501.

If the user selects the displayed icon, a new document file can be generated. The setting item values of the selected template are applied to as book attributes for the newly generated document.

Next, an example of a processing procedure to be executed when a template containing exception setting contents and relating application conditions is selected to apply the selected template to a document file (i.e., an editing object), after completing the processing described with reference to the flowchart illustrated in FIG. 15, is described below with reference to FIG. 20.

First, in step S2601, the bookbinding application 104 reads the application conditions from the template selected by the user. Next, in step S2602, the bookbinding application 104 reads the document file. In step S2603, the bookbinding application 104 determines whether a chapter or a page that can satisfy the application conditions is present.

If the chapter or the page that can satisfy the application conditions is present (YES in step S2603), then in step S2604, the bookbinding application 104 applies the exception setting contents included in the template to the chapter or the page that can satisfy the application conditions. More specifically, the bookbinding application 104 registers the page number to a "corresponding page designation method" of the chapter attributes or the page attributes that satisfy the conditions and further registers it in the tree structure illustrated in FIG. 3A.

Figure 20:
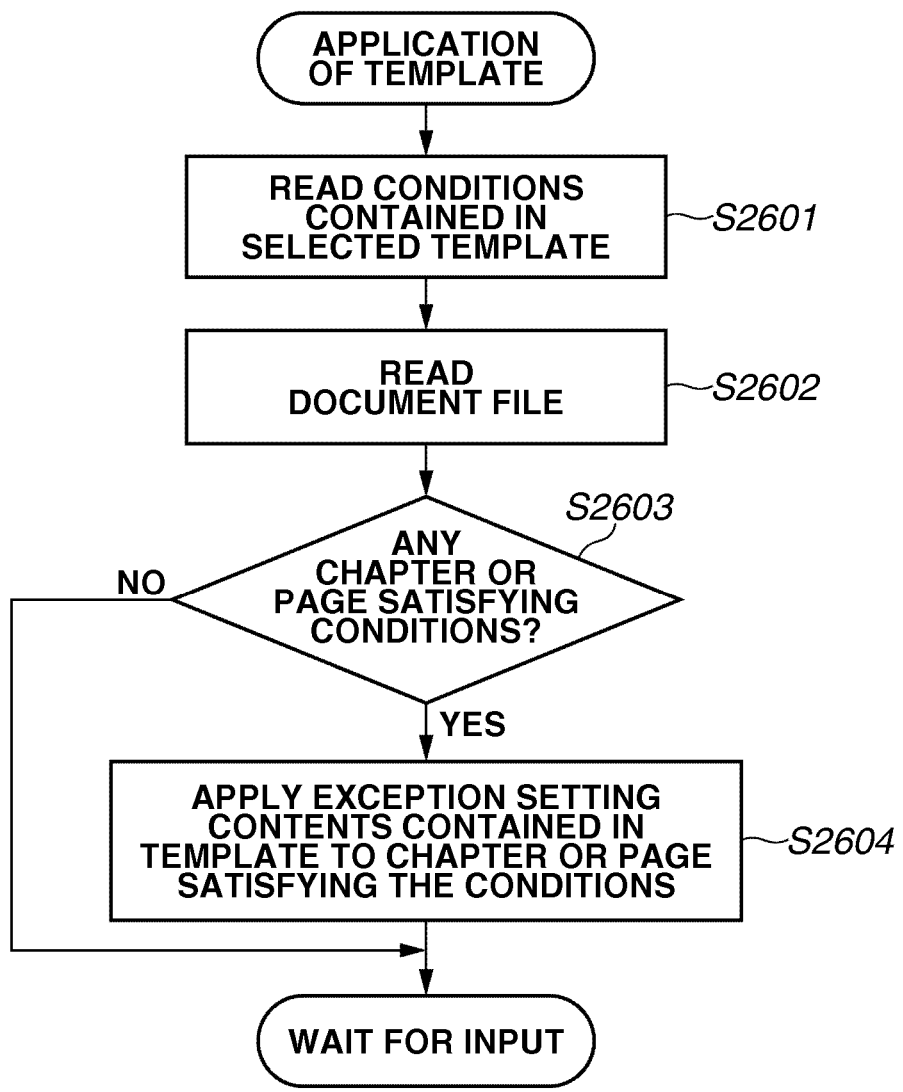
FIG. 20 is a flowchart illustrating an example of a procedure for applying a template to a document that can be executed by the bookbinding application in the document processing system according to an exemplary embodiment of the present invention.

If the chapter or the page that can satisfy the application conditions is not present (NO in step S2603), the bookbinding application 104 executes nothing and terminates the processing of the routine illustrated in FIG. 20.

Through the above-described processing, the bookbinding application 104 can apply exception settings determined for each setting object to a desired document file. If logical conditions are used as the conditions for a template, the bookbinding application 104 can simply apply previously used setting contents to a document file whose page number is changed.

Next, example effects that can be obtained by the above-described configuration and the processing procedure are described below with reference to FIGS. 21, 22, 23, and 24.

Figure 21:
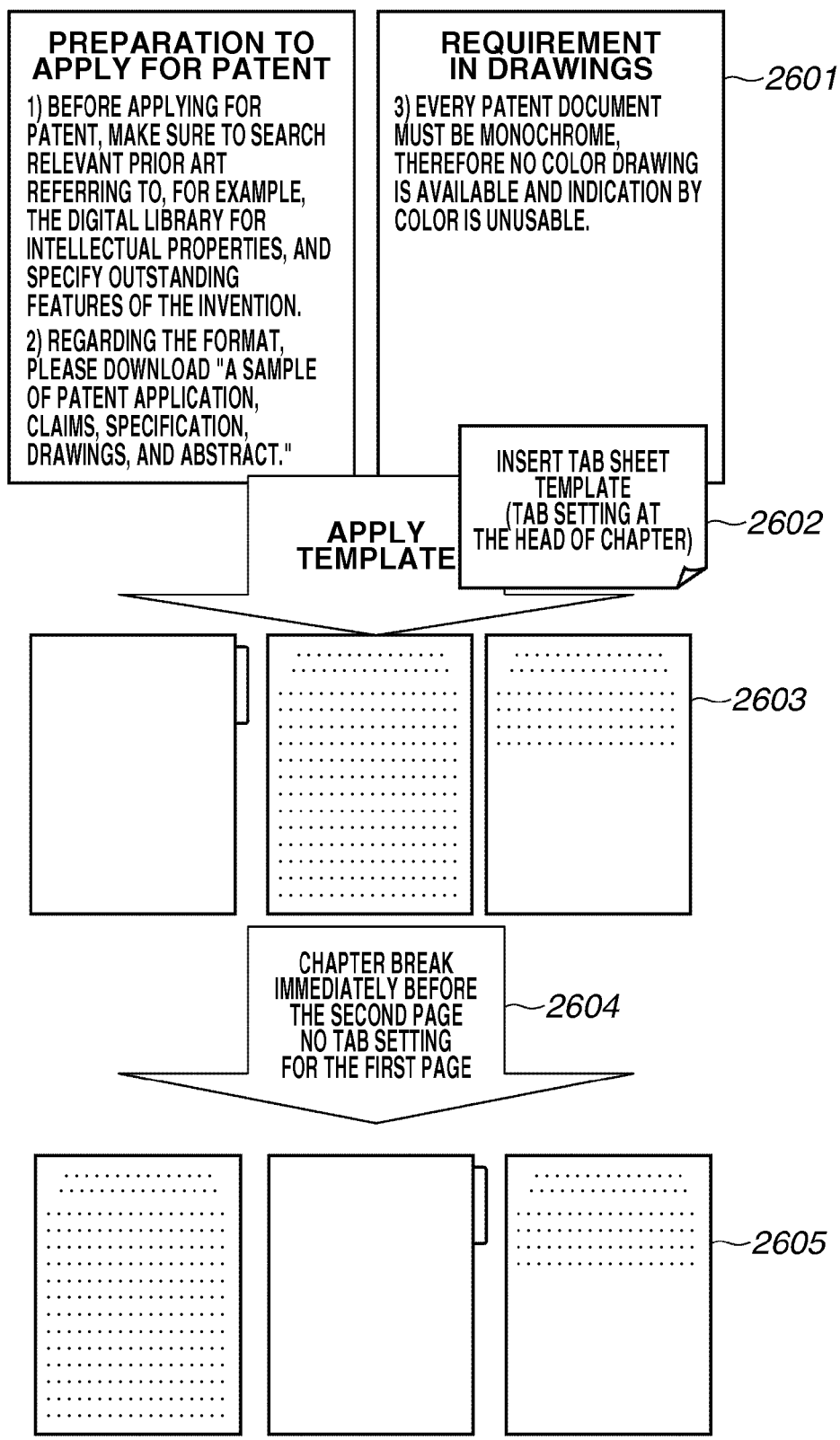
FIG. 21 illustrates an issue that may arise when a conventional template is used in the document processing system according to an exemplary embodiment of the present invention.

FIG. 21 illustrates an issue that may arise when a conventional template is used in the document processing system according to an exemplary embodiment of the present invention. Conventionally, users are allowed to designate a template when the electronic original writer 102 inputs an uploaded document 2601, which can be generated by the general application 101, to the bookbinding application 104.

According to the example illustrated in FIG. 21, the applied template is a tab sheet insertion template (i.e., tab sheet insertion at the head of a chapter) 2602, according to which a tab sheet that precedes the first page can be inserted as illustrated by reference numeral 2603.

However, the obtained result indicated by reference numeral 2603 may be dissatisfactory for a user in a case where the tab sheet requested by the user is a tab sheet to be inserted between the first and second pages.

In such a case, a modified result indicated by reference numeral 2605 can be obtained if a printer user operates the UI of the bookbinding application 104 to set "chapter break immediately before the second page" and "no tab setting for the first page."

However, if an uploading user changes the uploaded document to correct a part of the contents of the uploaded document, the printer user is required to repeat the above-described processing each time the uploaded data is received.

Figure 22:
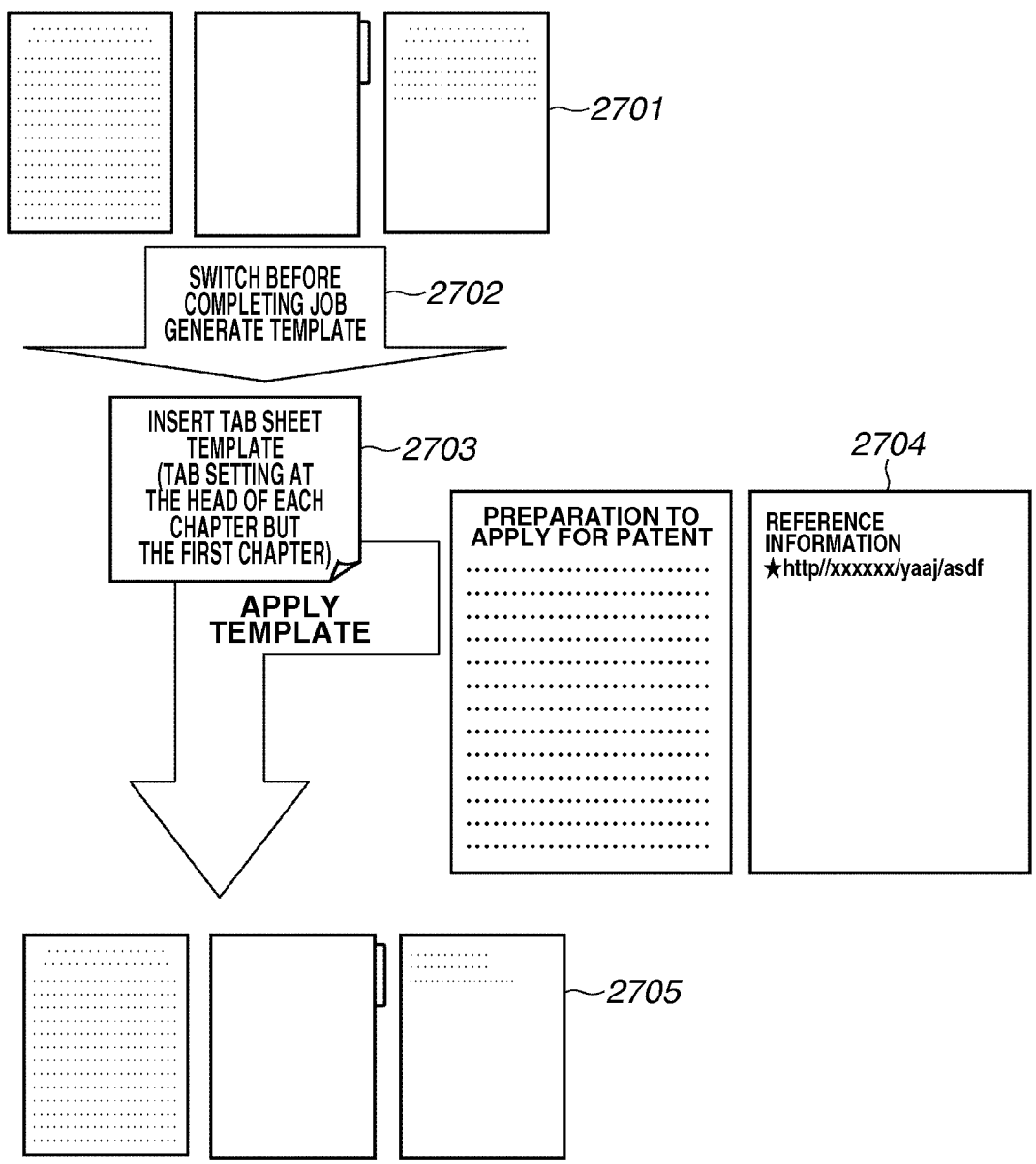
FIG. 22 illustrates an example of the effect of the present invention that can be brought by the bookbinding application in the document processing system according to an exemplary embodiment of the present invention.

FIG. 22 illustrates an example of the effect that can be brought by the present exemplary embodiment. A template 2703 can be generated based on a document 2701 that can be set according to the above-described procedure.

In this case, the template can be registered with the default page number designation 2304 in the application condition designation method field 2303.

Subsequently, if the bookbinding application 104 applies the template 2703 to a newly uploaded document 2704 that is similar to the document 2701, a result indicated by reference numeral 2705 that reflects a job midway switching setting can be immediately obtained.

Figure 23:
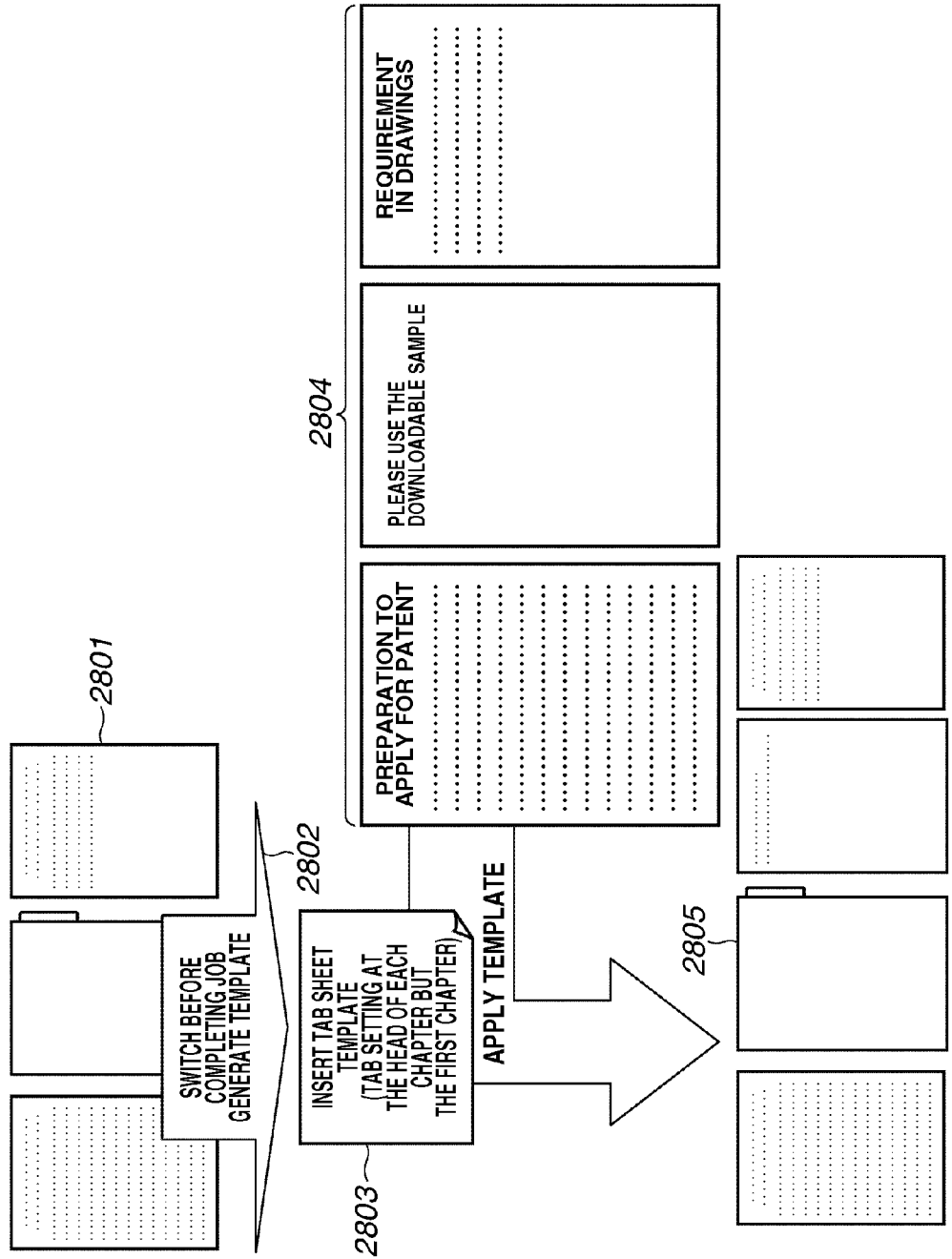
FIG. 23 illustrates an issue that may arise when a page number designation method template is used in the document processing system according to an exemplary embodiment of the present invention.

FIG. 23 illustrates an issue that may arise when the default setting in the application condition designation method field 2303 is the page number designation 2304.

A document 2804 includes a sentence newly added to the first page of the uploaded document 2601. Due to the addition of a new sentence, the page configuration is changed from two pages to three pages.

A template 2803 generated based on a document 2801 is applied to the document 2804.

The template 2803 includes the contents of "chapter break immediately before the second page" and "no tab setting for the first page." Therefore, a result indicted by reference numeral 2805 can be obtained.

However, the obtained result indicated by reference numeral 2805 is dissatisfactory in a case where the tab sheet requested by a document uploading user is a tab sheet to be inserted immediately before the third page on which the contents of "requirement in drawings" are present.

Figure 24:
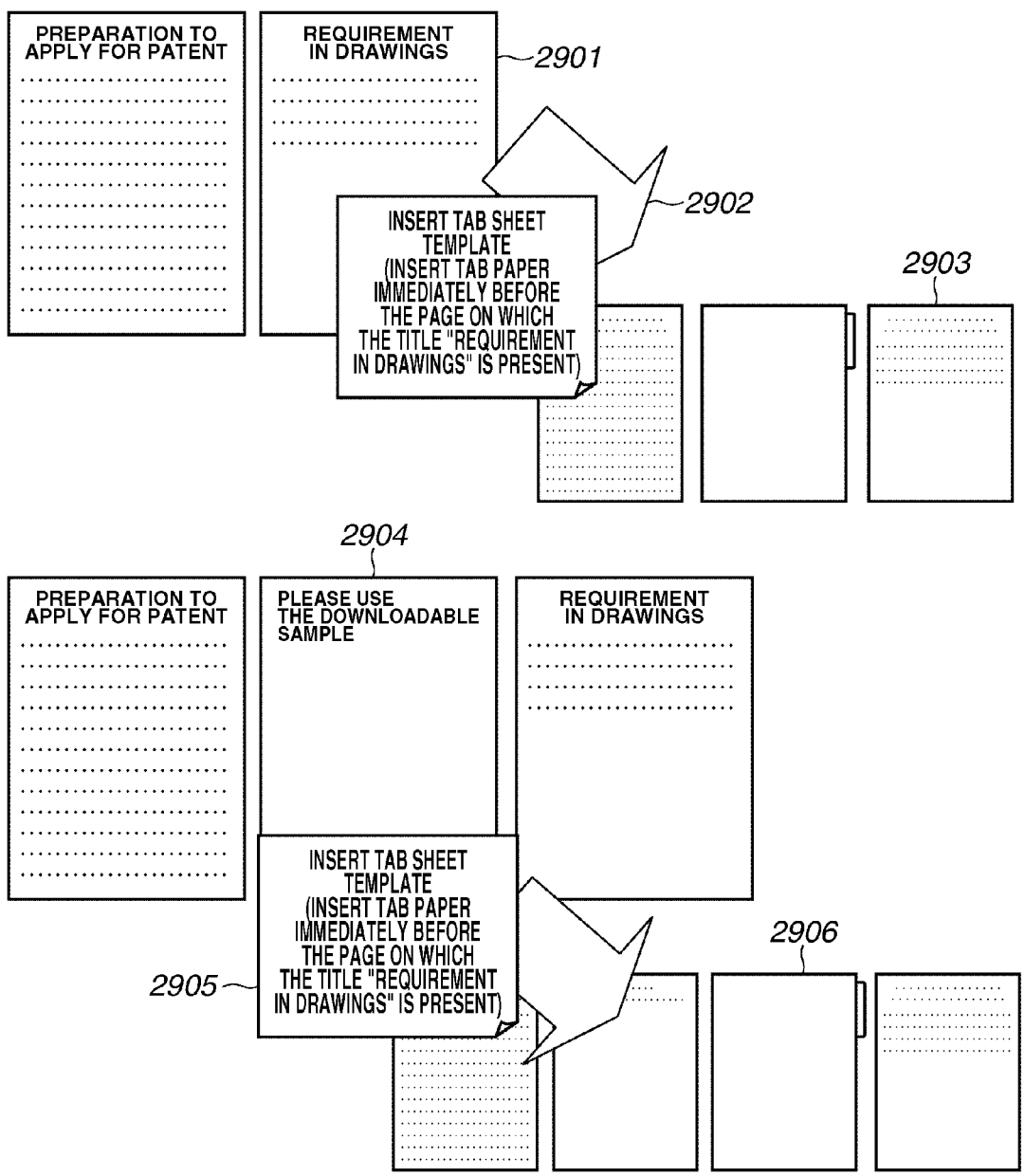
FIG. 24 illustrates an example of the effect of the present invention that can be brought by the bookbinding application in the document processing system according to an exemplary embodiment of the present invention.

The present exemplary embodiment can employ a method illustrated in FIG. 24 to solve the above-described issues.

A template 2902 designates to select the "logical condition designation" 2305 in the designation method field 2303 and select "^ requirement in drawings" in "character string contained in page (normalized expression)" to insert a tab sheet immediately before the page that starts with a character string "requirement in drawings."

Therefore, if this template 2905 is applied to a document 2904, a tab sheet 2906 can be inserted immediately before the target page as intended.

The document processing system according to the present exemplary embodiment, which has the above-described configuration and performs processing according to the above-described procedure, can register a template as a general template and can reuse the template even when an exception setting is set for a setting object contained in a document file. Therefore, even in a case where an original document to which complicated exception setting contents are applied is later changed, resetting can be simply performed.

In the present exemplary embodiment, a program that can be referred to as a "bookbinding application" is not exclusively used for a bookbinding operation and has a function for shaping the style of a document according to a user's preference. In this respect, the "bookbinding application"

according to the present exemplary embodiment can be also referred to as a document editing application.

The present invention can be applied to a system including a plurality of devices (e.g., a host computer, an interface device, a reader, and a printer) and can be also applied to a single apparatus or device (e.g., a copying machine, a facsimile machine, etc.).

Further, the present invention can be realized by executing the following processing. More specifically, a software program that can realize the functions of the above-described exemplary embodiments can be supplied to a system or an apparatus via a network or one of various storage media. A computer (or a CPU or a micro-processing unit (MPU)) provided in the system or the apparatus can read and execute the program to realize the functions of the above-described exemplary embodiments. In this case, the program itself and a storage medium storing the program can configure the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-314615 filed Dec. 10, 2008, which is hereby incorporated by reference herein in its entirety.

What is claimed is:

1. An information processing apparatus comprising:
an acceptance unit configured to accept selection of a page contained in a document file;
an extraction unit configured to extract, in a case where a selected page includes a print setting value different from a print setting value included in another page, the print setting value from the document file;
a display unit configured to display a setting screen for registering content of an exception setting and application conditions of the content of the exception setting as a template, wherein the setting screen is capable of setting the print setting value extracted by the extraction unit as the application conditions; and
an application unit configured to apply, in a case where the template is selected to be applied to a loaded document file, the exception setting to a page which satisfies the application conditions.

2. The information processing apparatus according to claim 1, wherein the setting screen is capable of setting a character string included in a page as the application conditions in the template.

3. The information processing apparatus according to claim 1, wherein the setting screen is capable of setting a character string included in a page using normalized expressions, as the application conditions in the template.

4. The information processing apparatus according to claim 1, wherein the setting screen accepts selection of page number or an item other than the page number to be designated as the application conditions, and is capable of setting, as the application conditions in a case where the setting screen accepts the item other than the number of the page to be designated as the application conditions, the print setting value extracted by the extraction unit.

5. A method for controlling an information processing apparatus, the method comprising:
accepting selection of a page contained in a document file;
extracting, in a case where a selected page includes a print setting value different from a print setting value included in another page, the print setting value from the document file;
displaying a setting screen for registering content of an exception setting and application conditions of the content of the exception setting as a template, wherein the setting screen is capable of setting the print setting extracted by the extraction unit as the application conditions; and
applying, in a case where the template is selected to be applied to a loaded document file, the exception setting to a page which satisfies the application conditions.

6. The method according to claim 5, wherein the setting screen is capable of a character string included in a page as the application conditions, in the template.

7. The method according to claim 5, wherein the setting screen is capable of setting a character string included in a page using normalized expressions, as the application conditions in the template.

8. The method according to claim 5, wherein the setting screen accepts selection of page number or an item other than the page number to be designated as the application conditions, and is capable of setting, as the application conditions in a case where the setting screen accepts the item other than the number of the page to be designated as the application conditions, the extracted print setting value.

9. A non-transitory computer-readable medium storing a program that causes a computer to operate as the information processing apparatus of claim 1.

* * * * *